(12) United States Patent
Watanabe et al.

(10) Patent No.: US 6,285,635 B1
(45) Date of Patent: Sep. 4, 2001

(54) OPTICAL DISK APPARATUS

(75) Inventors: Katsuya Watanabe, Nara; Takeharu Yamamoto, Takatsuki; Takashi Kishimoto, Moriguchi; Mitsurou Moriya, Ikoma, all of (JP)

(73) Assignee: Matsushia Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/087,545

(22) Filed: May 29, 1998

(30) Foreign Application Priority Data

May 30, 1997 (JP) .................................................. 9-142654
Oct. 9, 1997 (JP) .................................................. 9-276703

(51) Int. Cl.$^7$ .................................................. G11B 7/00
(52) U.S. Cl. .................................. 369/44.27; 369/44.37; 369/53.37; 369/53.45
(58) Field of Search .......................... 369/44.27, 44.14, 369/44.28, 44.29, 44.32, 44.35, 44.23, 44.34, 44.37, 47, 48, 49, 50, 54, 58, 59, 112, 47.1, 53.1, 53.37, 53.45

(56) References Cited

U.S. PATENT DOCUMENTS

Re. 36,445 * 12/1999 Miyagawa et al. ..................... 369/58
5,963,523 * 10/1999 Kayama et al. ........................ 369/58
6,111,832 * 8/2000 Tsuchiya et al. ....................... 369/54
6,125,087 * 9/2000 Ohnishi et al. ..................... 369/44.23

* cited by examiner

Primary Examiner—Muhammad Edun
(74) Attorney, Agent, or Firm—Ratner & Prestia

(57) ABSTRACT

An optical disk apparatus for reproducing information from plural types of information carriers or for recording information to plural types of information carriers, has two or more light sources with different wavelengths, a converging part for converging a light beam emitted from each of the light sources on said information carrier, a movement part for moving the converged spot of the light beam converged by the converging part in a direction substantially perpendicular to the surface of the information carrier, a convergence condition detection part for outputting a signal corresponding to the convergence condition of the light beam on the information carrier, an amplitude detection part for measuring the amplitude of the signal of the convergence condition detection part, and a focus control part for driving the movement part in accordance with the output signal of the convergence condition detection part and for performing control so that the convergence condition of the light beam on the information carrier becomes substantially constant, wherein at the start or restart of the apparatus, before the focus control part is driven, when one of the //

21 Claims, 16 Drawing Sheets

Fig. 16

(1) FE amplitude

| Disk | 780nm | 650nm | Distinction value (range) |
|---|---|---|---|
| CD, CD-R | CFE78 | CFE65 | CFE78 > FA |
| SD (single-layer) | SFE78 | SFE65 | FB < SFE65-SFE78 < FA |
| SD-W (double layer) | DFE78 | DFE65 | FC < DFE65-SFE78 < FB |
| CD-RW | WFE78 | WFE65 | WFE65-WFE78 < FC |

(2) AS amplitude

| Disk | 780nm | 650nm | Distinction value (range) |
|---|---|---|---|
| CD, CD-R | CAS78 | CAS65 | CAS78 > AA |
| SD (single-layer) | SAS78 | SAS65 | AB < SAS65-SAS78 < AA |
| SD-W (double layer) | DAS78 | DAS65 | AC < DAS65-SAS78 < AB |
| CD-RW | WAS78 | WAS65 | WAS65-WAS78 < AC |

(3) RFENV amplitude

| Disk | 780nm | 650nm | Distinction value (range) |
|---|---|---|---|
| CD, CD-R | CRF78 | CRF65 | CRF78 > RA |
| SD (single-layer) | SRF78 | SRF65 | RB < SRF65-SRF78 < RA |

OPTICAL DISK APPARATUS

BACKGROUND OF THE INVENTION

1. Field of the Invention

The present invention relates to an optical disk apparatus for optically recording signals to an information carrier and reproducing the recorded signals by using light beams from light sources, such as lasers.

2. Related Art of the Invention

Optical disk apparatuses for playing back CD audio and CD-ROM usually use a laser light source with a wavelength of 780 nm.

However, a laser light source with a wavelength of 650 nm is used for high-density optical discs (disks having higher density and larger capacity than CD, and simply referred to as SD).

An apparatus has been proposed, which is provided with a laser with a longer wavelength of 780 nm for CD, and a laser with a shorter wavelength of 650 nm for high-density disks, whereby the laser with the longer wavelength of 780 nm is used to play back CD and CD-R, and the laser with the shorter wavelength of 650 nm is used to play back the high-density disk, SD.

PROBLEMS THAT THE INVENTION IS TO SOLVE

In such an apparatus, it is unknown whether the disk having been loaded in the apparatus is CD or a density disk, SD. To make distinction, each of the two lasers is turned on, and focus servo control and tracking control are carried out, thereby to check whether the disk can be played back or not.

However, in the case that CD-R has been loaded, if laser light with the shorter wavelength is cast, and focus control and tracking servo control are carried out, the light beam from the laser is usually converged and cast to an area ranging from a quarter to a half of one round on the recording film of the disk, thereby causing a problem of erasing recorded information. The erasure of the information is serious to the extent that it cannot be recovered even when error correction is attempted, and the information may not be reproduced. The erasure occurs because of the following reason. Since the organic dye layer of the CD-R has usually been designed to have an optimal reflection characteristic at 780 nm, if laser light with a 650 nm or less is cast, the light is not reflected but absorbed. Therefore, it is difficult to detect the intensity of the reflected light corresponding to information marked on the recording film and to reproduce the information. In addition, the spot of the light beam becomes small and has high power per unit area, and the recording film itself has an absorption characteristic, whereby the recorded information may be erased.

Furthermore, in the case of the above-mentioned conventional optical disk apparatus, when the CD playback speed is increased to 6×, 12× and 24×, the wobbling acceleration and the eccentricity acceleration of the disk increase in proportion to the square of the playback speed (rotation speed) of the disk. As a result, the wobbling acceleration and the eccentricity acceleration may exceed the ranges made allowable by the gains of the focus control and tracking control depending on variations in the disk and variations in the chucking of the disk, whereby control cannot be pulled in, and a problem of disabling start may be caused.

Moreover, it is difficult for the spindle motor to have a constant torque characteristic in the range of high-speed rotation, such as 24×, to low-speed rotation, such as the standard speed. In addition, the spindle motor itself has variations. With these taken into consideration, the rotation control of the disk becomes unstable, and this unstable control causes jitter in reproduced signals, thereby causing a problem of low performance.

SUMMARY OF THE INVENTION

The present invention is intended to solve the problems encountered in the above-mentioned conventional art, and proposes a control method at the start of operation for reproduction (or recording) on CD, CD-R and novel high-density disks. In addition, the present invention also proposes a method of stably pulling in focus control and tracking control, and a method of stably carrying out rotation control, and provides an apparatus for playback and recording on novel high-density optical disks, as well as playback on CD at high performance.

MEANS OF SOLVING THE PROBLEMS

In the present invention, distinction is generally made to determine the type of disk before focus control and tracking control. The converged beam of light thus strikes the recording surface of the disk for a very short time (several milliseconds). Even if one of information marks is lost as a result, the lost mark can be corrected sufficiently, whereby no problem is caused in the reproduction of information.

Furthermore, in an apparatus provided with two or more lasers with longer and shorter wavelengths in accordance with the present invention, for example, in an apparatus provided with three lasers, the light of a laser 1 with the longest wavelength is first cast, and distinction is made to determine whether a loaded disk is CD, CD-R or not in a condition without focus control and tracking control. If the disk is not CD, CD-R, the light of the laser 2 with the second longest wavelength is cast next, and distinction is made to determine whether the loaded disk is a high-density disk or not in the condition without focus control and tracking control in a similar way. If the disk is not a high-density disk, the light of the laser 3 with the shortest wavelength is cast, and distinction is made to determine whether the loaded disk is a super high-density disk or not in the condition without focus control and tracking control in a similar way. The distinction proceeds in this order. When the light of each laser is cast and when the loaded disk is determined to be the type of disk to be played back by using the laser as the result of the distinction, focus control and tracking control are carried out for the first time, whereby binary operation and error correction are carried out, and information on the disk is reproduced.

Furthermore, in the present invention, an apparatus with high reproduction power (reproduction-compatible apparatus for disks, such as CD-RW) is configured to carry out emission at low power during the above-mentioned distinction. Therefore, even if laser light with a shorter wavelength should be cast to a disk, such as CD-R or the like, because of an error in the distinction, information can be prevented completely from being erased.

Next, configurations relating to the present application will be described below.

The first invention of the present configuration is an optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, an amplitude detection means for measuring the amplitude of said signal of said convergence condition detection means, and a focus control means for driving said movement means in accordance with said output signal of said convergence condition detection means and for performing control so that the convergence condition of said light beam on said information carrier becomes substantially constant, wherein at the start or restart of said apparatus, before said focus control means is driven, when one of said light sources with a predetermined wavelength is turned on, and when said movement means is driven to move said converging means close to and then away from said information carrier or away from and then close to said information carrier, said apparatus makes distinction to determine the type of said loaded information carrier on the basis of a signal from said amplitude detection means; if said light source with said predetermined wavelength is not compatible with the type of said loaded information carrier having been subjected to the distinction, another light source with a different wavelength is turned on, and said apparatus eventually finds a light source compatible with the type of said loaded information carrier and then drives said focus control means.

With the above-mentioned first configuration in accordance with the optical disk apparatus of the present invention, a laser with a wavelength of 780 nm used as the light source with a longer wavelength for CD, CD-R is turned on, and the light beam generated from the laser passes through a converging lens used as the converging means, and is converged and cast to a loaded optical disk used as the information carrier. In addition, a focus actuator used as the movement means is driven, and the amplitude of a focus error signal (FE), which is delivered from the convergence condition detection means and obtained when the light beam is moved close to and away from the optical disk, is measured. The measured value is compared with a predetermined distinction value to make distinction to determine whether the optical disk is CD, CD-R or SD. If the loaded optical disk is CD, CD-R, focus control and tracking control are carried out immediately, information (TOC information and the like) on the optical disk is read, and a standby condition is reached. If the loaded optical disk is SD other than CD, the light source with a wavelength of 780 nm is turned off once, and another light source with a shorter wavelength(for example 650 nm) is turned on. The light beam generated from the light source passes through the converging lens used as the converging means, and is converged and cast to the loaded optical disk used as the information carrier, focus control and tracking control are carried out, information (control track information and the like) on the optical disk is read, and a standby condition is reached.

The second invention of the present invention is an optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, a total light amount detection means for outputting a signal corresponding to the amount of light reflected from said information carrier, and a focus control means for driving said movement means in accordance with said output signal of said convergence condition detection means and for performing control so that the convergence condition of said light beam on said information carrier becomes substantially constant, wherein at the start or restart of said apparatus, before said focus control means is driven, when one of said light sources with a predetermined wavelength is turned on, and when said movement means is driven to move said converging means close to and then away from said information carrier or away from and then close to said information carrier, said apparatus makes distinction to determine the type of said loaded information carrier on the basis of a signal from said total light amount detection means; if said light source with said predetermined wavelength is not compatible with the type of said loaded information carrier having been subjected to the distinction, another light source with a different wavelength is turned on, and said apparatus eventually finds a light source compatible with the type of said loaded information carrier and then drives said focus control means.

With the above-mentioned second configuration in accordance with the optical disk apparatus of the present invention, a laser with a wavelength of 780 nm used as the light source with a longer wavelength for CD, CD-R is turned on, and the light beam generated from the light source passes through a converging lens used as the converging means, and is converged and cast to a loaded optical disk used as the information carrier. In addition, a focus actuator used as the movement means is driven, and the amplitude of a total light amount signal (AS), which is delivered from the total light amount detection means and obtained when the light beam is moved close to and away from the optical disk, is measured. The measured value is compared with a predetermined distinction value to make distinction to determine whether the optical disk is CD, CD-R or SD. If the loaded optical disk is CD, CD-R, focus control and tracking control are carried out immediately, information (TOC information and the like) on the optical disk is read, and a standby condition is reached. If the loaded optical disk is SD other than CD, the light source with a wavelength of 780 nm is turned off once, and another light source with a shorter wavelength(for example 650 nm) is turned on. The light beam generated from the light source passes through the converging lens used as the converging means, and is converged and cast to the loaded optical disk used as the information carrier, focus control and tracking control are carried out, information (control track information and the like) on the optical disk is read, and a standby condition is reached.

The third configuration of the present invention is an optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, a reproduction signal detection means for detecting the amplitude of an information signal recorded on said information carrier or the amplitude of a signal obtained by the envelope detection of said information signal, and a focus control means for driving said movement means in accordance with said output signal of said convergence condition detection means and for performing control so that the convergence condition of said light beam on said information carrier becomes substantially constant, wherein at the start or restart of said apparatus, before said focus control means is driven, when one of said light sources with a predetermined wavelength is turned on, and when said movement means is driven to move said converging means close to and then away from said information carrier or away from and then close to said information carrier, said apparatus makes distinction to determine the type of said loaded information carrier on the basis of a signal from said reproduction signal detection means; if said light source with said predetermined wavelength is not compatible with the type of said loaded information carrier having been subjected to the distinction, another light source with a different wavelength is turned on, and said apparatus eventually finds a light source compatible with the type of said loaded information carrier and then drives said focus control means.

With the above-mentioned third configuration in accordance with the third optical disk apparatus of the present invention, a laser with a wavelength of 780 nm used as the light source with a longer wavelength for CD, CD-R is turned on, and the light beam generated from the light source passes through a converging lens used as the converging means, and is converged and cast to a loaded optical disk used as the information carrier. In addition, a focus actuator used as the movement means is driven, and the amplitude of an RF envelope signal (RFENV), which is delivered from the reproduction signal detection means and obtained when the light beam is moved close to and away from the optical disk, is measured. The measured value is compared with a predetermined distinction value to make distinction to determine whether the optical disk is CD, CD-R or SD. If the loaded optical disk is CD, CD-R, focus control and tracking control are carried out immediately, information (TOC information and the like) on the optical disk is read, and a standby condition is reached. If the loaded optical disk is SD other than CD, the light source with a wavelength of 780 nm is turned off once, and another light source with a shorter wavelength(for example 650 nm) is turned on. The light beam generated from the light source passes through the converging lens used as the converging means, and is converged and cast to the loaded optical disk used as the information carrier, focus control and tracking control are carried out, information (control track information and the like) on the optical disk is read, and a standby condition is reached.

The fourth invention of the present configuration is an optical disk apparatus for reproducing information from plural types of information carriers or for recording information to plural types of information carriers, comprising a rotation means for rotating said information carrier, two or more light sources with different wavelengths, a converging means for converging a light beam emitted from each of said light sources on said information carrier, a movement means for moving the converged spot of said light beam converged by said converging means in a direction substantially perpendicular to the surface of said information carrier, and a convergence condition detection means for outputting a signal corresponding to the convergence condition of said light beam on said information carrier, wherein at the start or restart of said apparatus and with said rotation means remained nonoperable, when each of said light sources is turned on and light with a wavelength corresponding to said light source is cast, and when said movement means is driven to move said converging means close to and then away from said information carrier or away from and then close to said information carrier, said apparatus makes distinction between the presence or absence of said information carrier on the basis of a signal obtained from a predetermined means, wherein said signal obtained from said predetermined means is: (1) a signal from said convergence condition detection means, (2) a total light amount signal corresponding to the amount of light reflected from said information carrier, (3) an information signal recorded on said information carrier or a signal obtained by the envelope detection of said information signal, or a signal obtained by combining a plurality of signals of these signals.

With the above-mentioned fourth configuration in accordance with the optical disk apparatus of the present invention, while a spindle motor used as the optical disk rotation means is stopped, a laser with a longer wavelength of 780 nm is turned on first, a converging lens used as the converging means is moved up and down (close to and away from) with respect to a disk by driving a focus actuator used as the first movement means, the amplitudes of a focus error signal, a total light amount signal, signal RF and the like generated during the movement are detected. On the basis of the detected values, the apparatus makes distinction to determine whether a disk has been loaded or not. Next, a laser with a shorter wavelength of 650 nm is turned on, the converging lens used as the converging means is moved up and down (close to and away from) with respect to a disk by driving the focus actuator used as the first movement means, and the amplitudes of the focus error signal, the total light amount signal, the signal RF and the like generated during the movement are detected. On the basis of the detected values, the apparatus makes distinction to determine whether a disk has been loaded or not. As described above, the distinction is made by using the lasers with different wavelengths. Therefore, if a disk has been loaded, the detected amplitudes become significant when either of the lasers is active, whereby the accuracy of detection and distinction can be improved. Furthermore, since the spindle motor is stopped, even if the laser light with the shorter wavelength is cast to a dye-based disk, such as CD-R, the spot of the light can be limited to an error correctable size of a few microns or less, whereby a problem of recorded data damage can be prevented. In addition, since the turntable for accommodating a disk and the clamp for holding the disk are not rotated during the distinction, it is possible to prevent noise and damage which may be caused if the turntable and the clamp are rotated while no disk is loaded.

The fifth configuration of the present invention is an optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, an amplitude detection means for measuring the amplitude of said signal of said convergence condition detection means, and a focus control means for driving said movement means in accordance with said output signal of said convergence condition detection means and for performing control so that the convergence condition of said light beam on said information carrier becomes substantially constant, wherein at the start or restart of said apparatus, before said focus control means is driven, when said movement means is driven to move said converging means close to and then away from said information carrier or away from and then close to said information carrier, and when each of said light sources is turned on and light with a wavelength corresponding to said light source is cast, a signal obtained from said amplitude detection means in this emission condition is stored in a storage means, said apparatus makes distinction to determine the type of said loaded information carrier on the basis of the data stored in said storage means, and said apparatus finds a light source compatible with the type of said loaded information carrier and then drives said focus control means.

With the above-mentioned fifth configuration in accordance with the optical disk apparatus of the present invention, a laser with a wavelength of 780 nm used as the light source with a longer wavelength for CD, CD-R is turned on, and the light beam generated from the light source passes through a converging lens used as the converging means, and is converged and cast to a loaded optical disk used as the information carrier. In addition, a focus actuator used as the movement means is driven, the amplitude of a focus error signal (FE), which is delivered from the convergence condition detection means and obtained when the light beam is moved close to and away from the optical disk, is measured. The measured value is stored in a DSP, RAM in a microcomputer or the like used as the storage means. Next, the light source with a wavelength of 780 nm is turned off once, and another light source with a shorter wavelength (for example 650 nm) is turned on. The light beam generated from the light source passes through the converging lens used as the converging means, and is converged and cast to the loaded optical disk used as the information carrier. The focus actuator is driven, and the amplitude of a focus error signal (FE), which is delivered from the convergence condition detection means and obtained when the light beam is moved close to and away from the optical disk, is measured. The measured value is stored in the DSP, RAM in the microcomputer or the like used as the storage means. The stored amplitude values of the signals FE are compared with each other and subjected to arithmetic operation to make distinction to determine the type of the loaded disk. Depending on the result of the distinction, predetermined starting parameters are set. Focus control and tracking control are carried out, information (TOC information, control track information and the like) on the optical disk is read, and a standby condition is reached.

The sixth invention of the present configuration is an optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, a total light amount detection means for outputting a signal corresponding to the amount of light reflected from said information carrier, and a focus control means for driving said movement means in accordance with said output signal of said convergence condition detection means and for performing control so that the convergence condition of said light beam on said information carrier becomes substantially constant, wherein at the start or restart of said apparatus, before said focus control means is driven, when said movement means is driven to move said converging means close to and then away from said information carrier or away from and then close to said information carrier, and when each of said light sources is turned on and light with a wavelength corresponding to said light source is cast, a signal obtained from said total light amount detection means in this emission condition is stored in a storage means, said apparatus makes distinction to determine the type of said loaded information carrier on the basis of the data stored in said storage means, and said apparatus finds a light source compatible with the type of said loaded information carrier and then drives said focus control means.

With the above-mentioned sixth configuration in accordance with the optical disk apparatus of the present invention, a laser with a wavelength of 780 nm used as the light source with a longer wavelength for CD, CD-R is turned on, and the light beam generated from the light source passes through a converging lens used as the converging means, and is converged and cast to a loaded optical disk used as the information carrier. In addition, a focus actuator used as the movement means is driven, and the amplitude of a total light amount signal (AS), which is delivered from the total light amount detection means and obtained when the light beam is moved close to and away from the optical disk, is measured. The measured value is stored in a DSP, RAM in a microcomputer or the like used as the storage means. Next, the light source with a wavelength of 780 nm is turned off once, and another light source with a shorter wavelength (for example 650 nm) is turned on. The light beam generated from the light source passes through the converging lens used as the converging means, and is converged and cast to the loaded optical disk used as the information carrier. The focus actuator is driven, and the amplitude of a total light amount signal (AS), which is delivered from the total light amount detection means and obtained when the light beam is moved close to and away from the optical disk, is measured. The measured value is stored in the DSP, RAM in the microcomputer or the like used as the storage means. The stored amplitude values of the signals AS are compared with each other and subjected to arithmetic operation to make distinction to determine the type of the loaded disk. Depending on the result of the distinction, predetermined starting parameters are set. Focus control and tracking control are carried out, information (TOC information, control track information and the like) on the optical disk is read, and a standby condition is reached.

The seventh configuration of the present invention is an optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, a reproduction signal detection means for detecting the amplitude of an information signal recorded on said information carrier or the amplitude of a signal obtained by the envelope detection of said information signal, and a focus control means for driving said movement means in accordance with said output signal of said convergence condition detection means and for performing control so that the convergence condition of said light beam on said information carrier becomes substantially constant, wherein at the start or restart of said apparatus, before said focus control means is driven, when said movement means is driven to move said converging means close to and then away from said information carrier or away from and then close to said information carrier, and when each of said light sources is turned on and light with a wavelength corresponding to said light source is cast, a signal obtained from said reproduction signal detection means in this emission condition is stored in a storage means, said apparatus makes distinction to determine the type of said loaded information carrier on the basis of the data stored in said storage means, and said apparatus finds a light source compatible with the type of said loaded information carrier and then drives said focus control means.

With the above-mentioned seventh configuration in accordance with the optical disk apparatus of the present invention, a laser with a wavelength of 780 nm used as the light source with a longer wavelength for CD, CD-R is turned on, and the light beam generated from the light source passes through a converging lens used as the converging means, and is converged and cast to a loaded optical disk used as the information carrier. In addition, a focus actuator used as the movement means is driven, and the amplitude of an RF envelope signal (RFENV), which is delivered from the reproduction signal detection means and obtained when the light beam is moved close to and away from the optical disk, is measured. The measured value is stored in a DSP, RAM in a microcomputer or the like used as the storage means. Next, the light source with a wavelength of 780 nm is turned off once, and another light source with a shorter wavelength is turned on. The light beam generated from the light source passes through the converging lens used as the converging means, and is converged and cast to the loaded optical disk used as the information carrier. The focus actuator is driven, and the amplitude of an RF envelope signal (RFENV), which is delivered from the reproduction signal detection means and obtained when the light beam is moved close to and away from the optical disk, is measured. The measured value is stored in the DSP, RAM in the microcomputer or the like used as the storage means. The stored amplitude values of the signals RFENV are compared with each other and subjected to arithmetic operation to make distinction to determine the type of the loaded disk. Depending on the result of the distinction, predetermined starting parameters are set. Focus control and tracking control are carried out, information (TOC information, control track information and the like) on the optical disk is read, and a standby condition is reached.

The eighth configuration of the present invention corresponding to claim 14 is an optical disk apparatus comprising a rotation means for rotating an information carrier at a predetermined rotation speed, a converging means for converging a light beam on said information carrier, a first movement means for moving the converged spot of said light beam converged by said converging means in a direction substantially perpendicular to the surface of said information carrier, a focus error detection means for outputting a signal corresponding to the convergence condition of said light beam on said information carrier, a focus control means for driving said first movement means in accordance with said output signal of said focus error detection means and for performing control so that the convergence condition of said light beam on said information carrier becomes substantially constant, a second movement means for moving said converged spot of said light beam converged by said converging means in a direction substantially perpendicular to the track on said information carrier, a track error detection means for outputting a signal corresponding to the relationship between said light beam and said track, and a tracking control means for driving said second movement means in accordance with said output signal of said track error detection means and for performing control so that said converged spot of said light beam on said information carrier properly scans along said track, wherein said focus control means or said tracking control means is activated at the start of said apparatus immediately after said rotation means is driven and before said information carrier reaches a predetermined rotation speed.

With the above-mentioned eighth configuration in accordance with the eighth optical disk apparatus of the present invention, before the rotation speed of an optical disk used as the information carrier reaches a predetermined value, that is, before eccentricity acceleration and wobbling acceleration become large, focus control and tracking control are carried out, and information (TOC, control track information and the like) on the optical disk is read. After the rotation speed reaches the predetermined value, a standby condition is reached.

The ninth invention of the present configuration is an optical disk apparatus comprising a rotation means for rotating an information carrier at a predetermined rotation speed, a converging means for converging a light beam on said information carrier, a first movement means for moving the converged spot of said light beam converged by said converging means in a direction substantially perpendicular to the surface of said information carrier, a focus error detection means for outputting a signal corresponding to the convergence condition of said light beam on said information carrier, a focus control means for driving said first movement means in accordance with said output signal of said focus error detection means and for performing control so that the convergence condition of said light beam on said information carrier becomes substantially constant, a second movement means for moving said converged spot of said light beam converged by said converging means in a direction substantially perpendicular to the track on said information carrier, a track error detection means for outputting a signal corresponding to the relationship between said light beam and said track, and a tracking control means for driving said second movement means in accordance with said output signal of said track error detection means and for performing control so that said converged spot of said light beam on said information carrier properly scans along said track, wherein if said focus control means or said tracking control means is unable to operate at the start of said apparatus after said information carrier has reached a predetermined rotation speed by using said rotation means, the rotation speed of said rotation means is reduced, and said focus control means or said tracking control means is activated again.

With the above-mentioned ninth configuration in accordance with the ninth optical disk apparatus of the present invention, an optical disk used as the information carrier is rotated at a predetermined rotation speed. At the rotation speed, focus control and tracking control are pulled in. If the pull-in ends in failure, and the focus control and tracking control are not activated, the rotation speed of the disk is lowered, and focus control and tracking control are pulled in again. If the focus control and tracking control are activated at the rotation speed, information (TOC, control track information and the like) on the optical disk is read, and a standby condition is reached.

The tenth configuration of the present invention is an optical disk apparatus comprising a rotation means for rotating an information carrier, a rotation control means for performing control so that said rotation means is rotated at a predetermined rotation speed, a gain switching means for switching the gain of said rotation control means, a rotation speed measurement means for measuring the rotation speed of said rotation means, and a rotation speed switching time measurement means for measuring the time required until a predetermined first rotation speed is raised to a predetermined second rotation speed on the basis of the measured value of said rotation speed measurement means, wherein said gain is switched by said gain switching means on the basis of the measured value of said rotation speed switching time measurement means.

With the above-mentioned tenth configuration in accordance with the optical disk apparatus of the present invention, when an optical disk used as the information carrier is rotated at a predetermined rotation speed, the time required until a first rotation speed is raised to a second rotation speed is measured. The control gain for a spindle motor used as the rotation means is switched depending on the measured time.

The eleventh configuration of the present invention is an optical disk apparatus comprising rotation means for rotating a information carrier, rotation control means for making a rotation speed of said rotation means at a predetermined value, gain switching means for changing a gain of said rotation control means, rotation speed measurement means for measuring the rotation speed of said rotation means, rotation changing period measurement means for measuring such a period that said measured rotation speed becomes a second predetermined speed from a first predetermined speed on the basis of the output of said rotation speed measurement means, wherein said apparatus judges the presence or absence of said information carrier on the basis of said time required until the rotation speed of said rotation changing period measurement means.

With the above-mentioned eleventh configuration in accordance with the optical disk apparatus of the present invention, when an optical disk used as the information carrier is rotated at a predetermined rotation speed, the time required until a first rotation speed is raised to a second rotation speed is measured. Whether a disk has been loaded or not is determined depending on the measured value. Therefore, the presence or absence of a disk can be determined in a period between the time when the motor is rotated and the time when the rotation speed of the motor reaches the predetermined value, whereby the time for starting can be shortened.

BRIEF DESCRIPTION OF THE DRAWINGS

FIG. 3 shows the details of portions of waveforms which are obtained when a conventional CD is loaded in the optical disk in accordance with the present invention and when focus control is pulled in;

FIG. 4 shows the details of portions of waveforms which are obtained when a novel high-density CD is loaded in the optical disk in accordance with the present invention and when focus control is pulled in;

FIG. 16 shows values of signals which are obtained when each of a conventional CD and a novel high-density disk is loaded in the optical disk apparatus in accordance with the fifth to seventh embodiments of the present invention and when the light of each of lasers with different wavelengths is converged and cast, and which are stored in RAM, and FIG. 16 also shows the distinction levels of the values.

Figure 1:
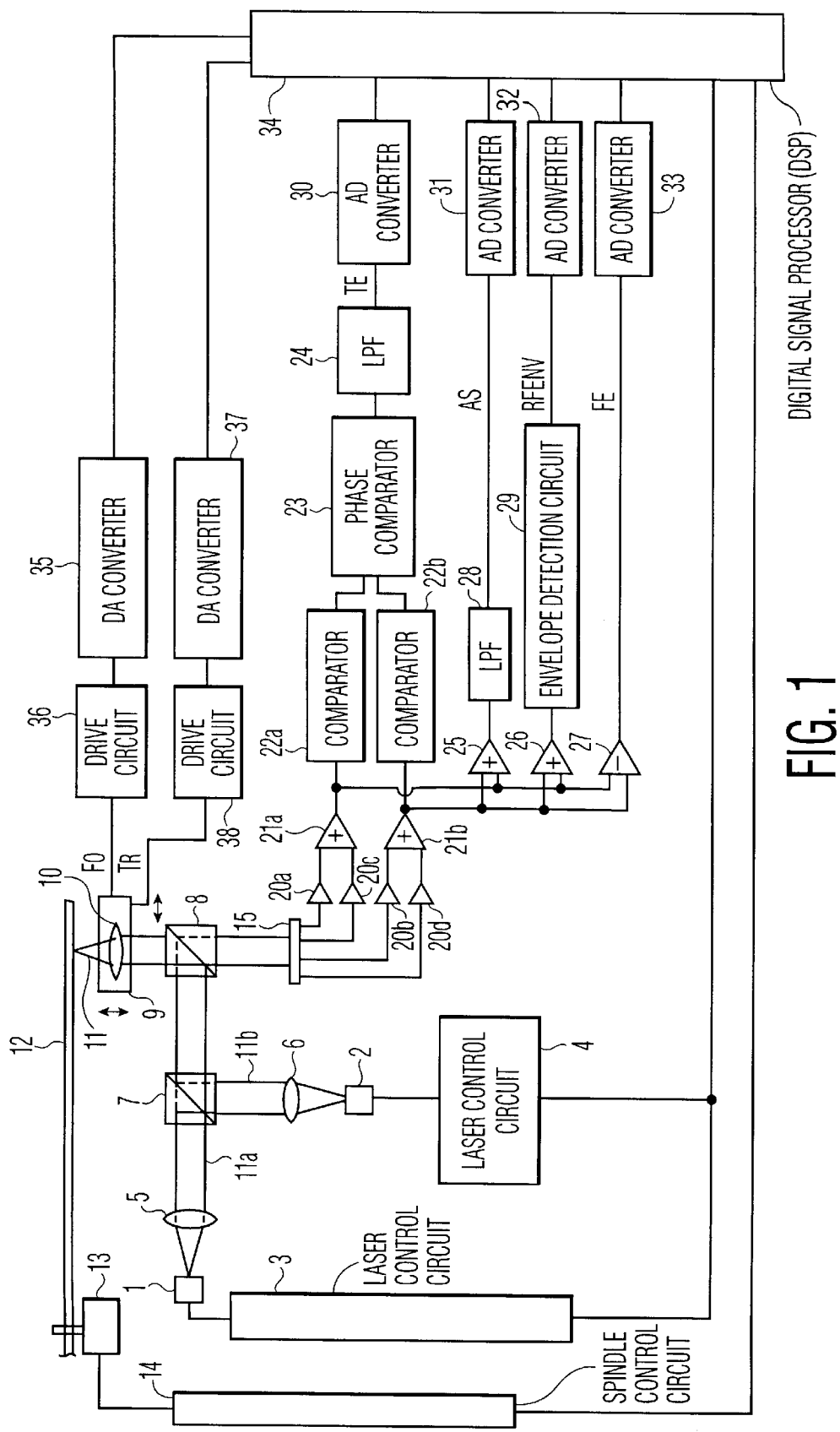
FIG. 1 is a block diagram showing an configuration of an optical disk in accordance with the first, second, third, fourth and tenth embodiments of the present invention.

Description of Symbols 1. 780 nm laser
2. 650 nm laser
3. laser control circuit
4. laser control circuit
5. coupling lens
6. coupling lens
7. wavelength-dependent polarizer
8. polarized beam splitter
9. actuator
10. converging lens
11. light beam
12. disk
13. spindle motor
14. spindle control circuit 15. photo-detector
20. current-voltage conversion amplifier
21. adder
22. comparator
23. phase comparator
24. low-pass filter
25. adder
26. adder
27. differential amplifier
28. low-pass filter
29. envelope detection circuit
30. AD converter
31. AD converter
32. AD converter
33. AD converter
34. Digital signal processor (DSP)
35. DA converter
36. Drive circuit
37. DA converter
38. Drive circuit
41. gain adjusting portion
42. hall device
43. comparator

EMBODIMENTS OF THE INVENTION

Embodiments of the present invention will be described below in detail referring to the accompanying drawings. In the drawings, components having like functions are designated by like reference codes.

FIG. 1 is a block diagram showing an optical disk apparatus provided with two laser light sources with different wavelengths to play back two or more types of disks different in density, such as CD and SD.

As shown in FIG. 1, the optical disk apparatus of the present invention has an optical system for casting a light beam 11 to a disk 12 used as an information carrier, comprising a laser light source 1 with a longer wavelength, a coupling lens 5 for converting outgoing light from the light source 1 to parallel light, a laser light source 2 with a shorter wavelength, a coupling lens 6 for converting outgoing light from the light source 2 to parallel light, a wavelength-dependent polarizer 7, a polarized beam splitter 8, an actuator 9, a converging lens 10, a laser control circuit 3 for controlling the laser light source 1 and a laser control circuit 4 for controlling the laser light source 2. The laser light sources 1 and 2 are controlled by signals from a digital signal processor 34 via the laser control circuits 3, 4.

The light beam generated from the laser 1 is converted to parallel light by the coupling lens 5. This parallel light passes through the wavelength-dependent polarizer 7, also passes through the polarized beam splitter 8, and is converged by the converging lens 10 which is moved in focusing and tracking directions by the actuator 9 so as to form a light beam spot on the disk 12.

In a similar manner, the light beam generated from the laser 2 is converted to parallel light by the coupling lens 6. This parallel light passes through the wavelength-dependent polarizer 7, also passes through the polarized beam splitter 8, and is converged by the converging lens 10 which is moved in focusing and tracking directions by the actuator 9 so as to form a light beam spot on the disk 12. Light beams 11a, 11b generated from the lasers 1, 2, respectively, are cast to the disk 12 which is rotated by a disk motor 13. These two light beams are selectively used depending on the type of disk having been loaded.

When a disk having a conventional density, such as CD and CD-R, has been loaded, the laser light source 1 with a wavelength of 780 nm is turned on via the laser control circuit 3 depending on a control signal from the digital signal processor 34. When a novel high-density disk, such as SD, has been loaded, the laser light source 2 with a wavelength of 650 nm is turned on via the laser control circuit 4 depending on a control signal from the digital signal processor 34.

This optical disk apparatus is provided with a quarter-split photo-detector 15 used as a component to receive reflected light from the disk 12. In addition, the reflected light from the disk 12 passes through the converging lens 10 and the polarized light beam splitter 8, and enters the quarter-split photo-detector 15. The quarter-split photo-detector 15 has a configuration indicated by split lines shown in FIG. 2. A signal indicating the sum of two portions orthogonal to each other, i. e., A and C, is generated by an adder 21a via current-voltage conversion amplifiers 20a, 20c. Another signal indicating the sum of two portions orthogonal to each other, i. e., B and D, is generated by an adder 21b via current-voltage conversion amplifiers 20b, 20d. The difference signal between the two signals is obtained by a differential amplifier 27, whereby astigmatism is formed, and a focus error signal FE is obtained. In addition, the two signals indicating the sums of four portions orthogonal to each other are converted to binary signals by comparators 22a, 22b, respectively, the phases of the binary signals are compared with each other by a phase comparator 23, and noise is eliminated from the output of the phase comparator 23 by using a low-pass filter 24, thereby to obtain a phase-difference tracking signal TE (tracking error signal).

Furthermore, the total sum of the amounts of light at the channels (detectors) A to D of the four-split photo-detector 15 is obtained by an adder 25, and the signal of the total sum is allowed to pass through a low-pass filter 28 to generate a total light amount signal AS. The same signal of the total sum is obtained by an adder 26 for a high-frequency band in a similar way, and is subjected to envelope detection to generate an RF envelope detection signal RFENV. The signal of the adder 26 is subjected to gain control, equalizing and the like, and becomes a signal for reading information on the disk 12. However, this is not directly related to the present invention, and its detailed further descriptions are omitted.

The signals FE, TE, AS and RFENV generated as described above are input to the digital signal processor (DSP) 34. This digital signal processor 34 receives FE or TE as an input signal and carries out digital filter operations comprising addition, delay and multiplication, whereby low-frequency gain compensation and phase compensation near the intersection of gains are performed for focus control and tracking control. Hereafter, the digital signal processor 34 delivers a focus control signal to a drive circuit 36 via a DA converter 35. The drive circuit 36 amplifies the control signal received from the DA converter 35 with respect to current, and delivers the signal to the actuator 9 so as to attain focus control. In addition, the digital signal processor 34 delivers a tracking control signal to a-drive circuit 38 via a DA converter 37. The drive circuit 36 amplifies the control signal received from the DA converter 37 with respect to current, and delivers the signal to the actuator 9 so as to attain tracking control.

Figure 2:
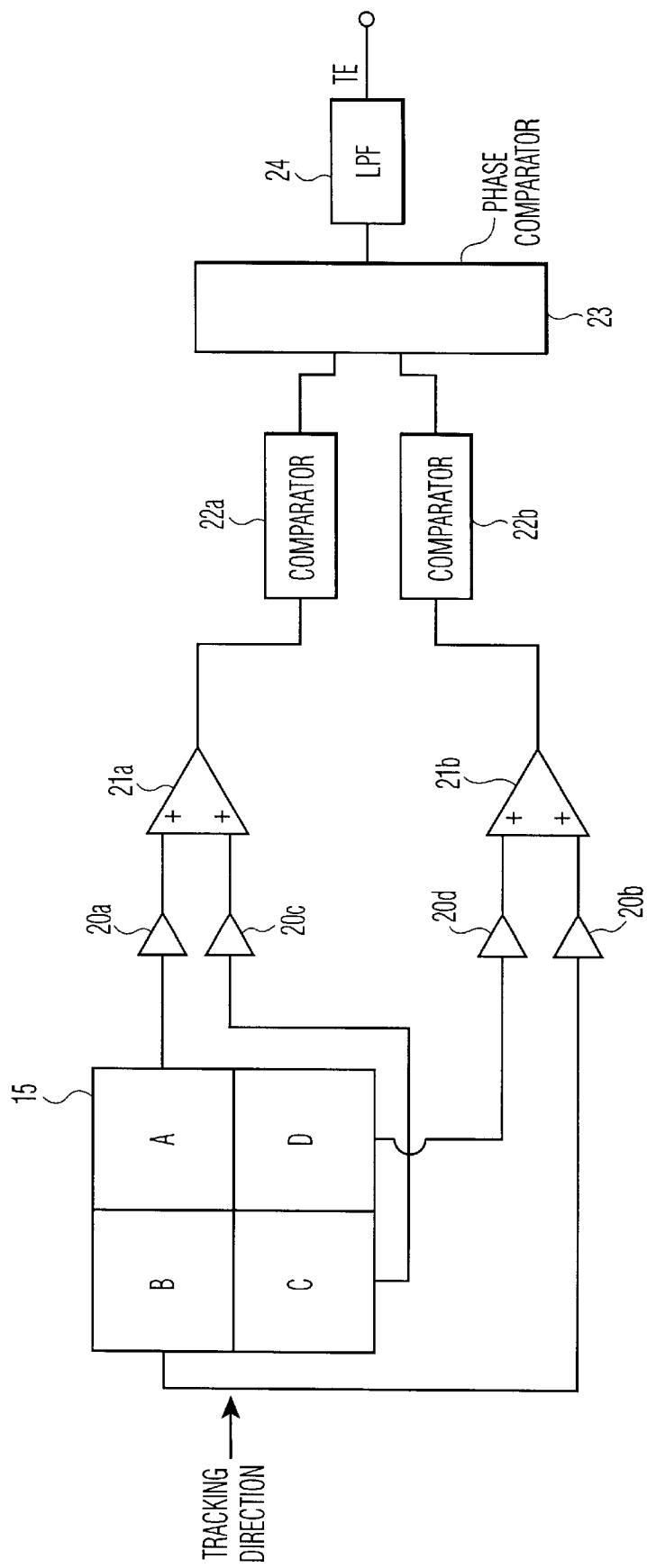
FIG. 2 is a block diagram showing the detail of a portion of a photo-detector in the configuration of an optical disk in accordance with the present invention.
Figure 3:
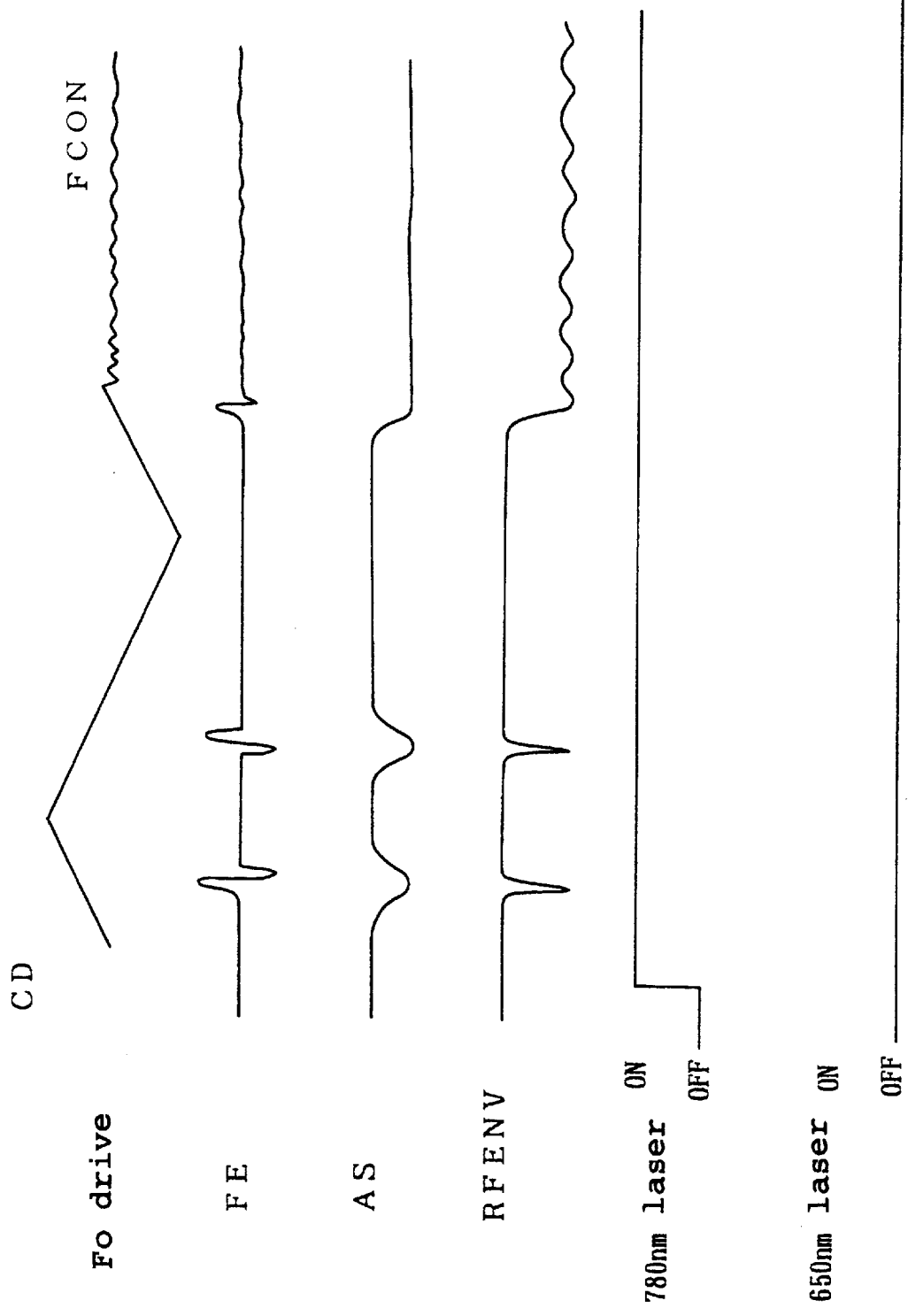
Figure 4:
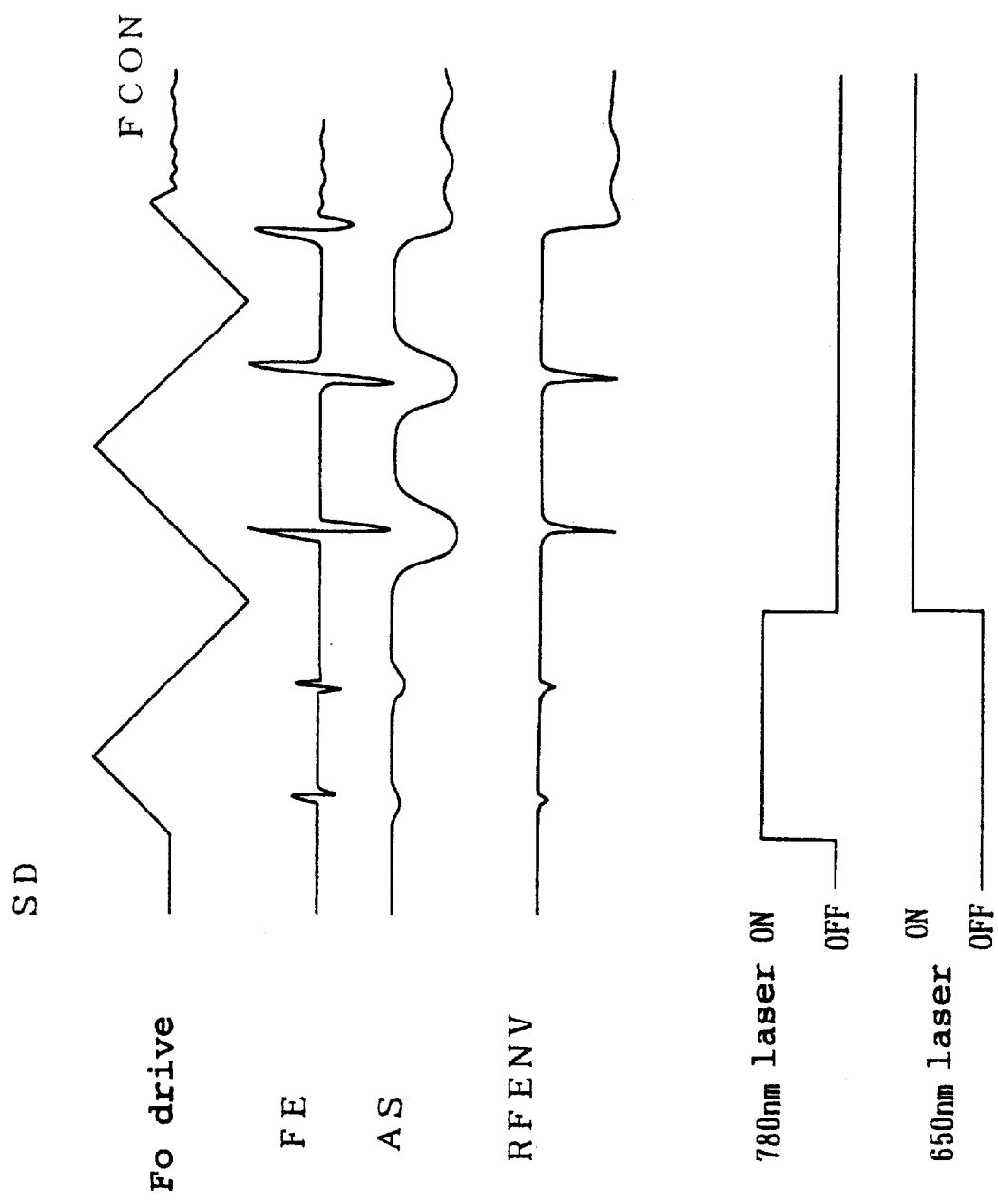

Next, a method of distinction between CD and SD, including laser control at the start of operation in accordance with first to third embodiments of the present invention will be detailed below referring to FIGS. 1 and 2 together with FIGS. 3 and 4. FIG. 3 shows the waveforms of the signals FE, AS and RFENV and the drive signal of the actuator 9 in the focusing direction, which are obtained when the laser light sources 1 and 2 are turned on in accordance with the sequence of the present invention, and the converging lens 10 is moved up and down in the focusing direction at the start of operation when CD has been loaded. In addition, FIG. 4 shows the waveforms of the signals FE, AS and RFENV and the drive signal of the actuator 9 in the focusing direction, which are obtained when the laser light sources 1 and 2 are turned on in accordance with the sequence of the present invention, and the converging lens 10 is moved up and down in the focusing direction at the start of operation when SD has been loaded.

The configuration of the first embodiment will be described below. As shown in FIGS. 3 and 4, the laser 1 with a longer wavelength of 780 nm has characteristics suited for CD, and the laser 2 with a shorter wavelength of 650 nm has characteristics suited for SD. However, if there is almost no difference between CD and SD in the outer dimensions, it is unknown which laser should be turned on.

Figure 5:
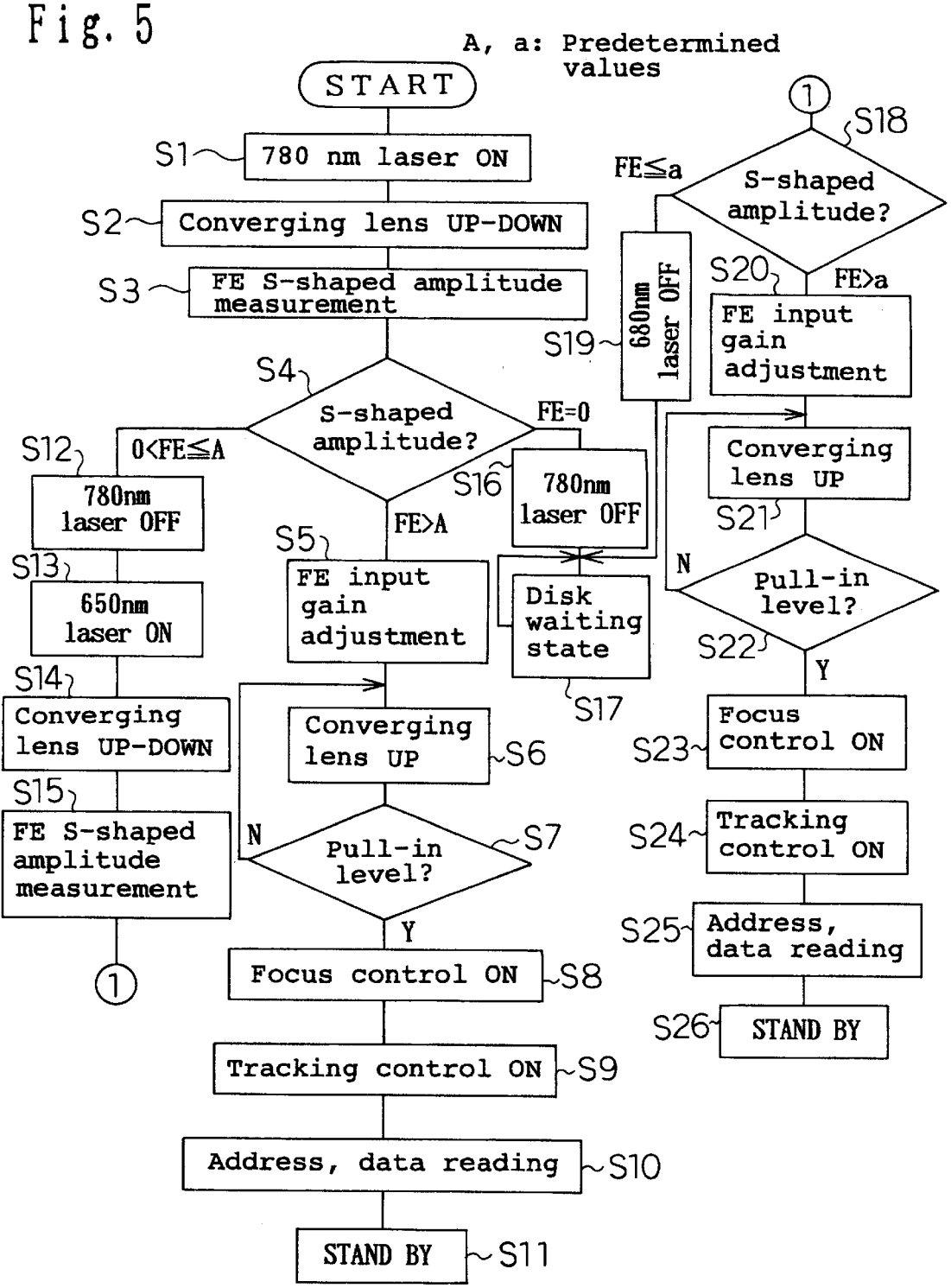
FIG. 5 is a flowchart showing a starting procedure in accordance with a first embodiment of the present invention.

In the first embodiment, as shown in FIG. 5, a signal is first sent from the DSP 34 to the laser control circuit 3 to turn on the laser light 1 with the longer wavelength (at step S1). Next, the converging lens 10 is moved up and down (at step S2). If CD or CD-R has been loaded in the apparatus at this time, the amplitude of an S-shaped signal generated on FE becomes larger than a predetermined comparison value as shown in FIG. 3 (at steps S3, S4). On the basis of the amplitude, the DSP 34' detects that the loaded disk 12 is CD or CD-R, drives the converging lens 10 so as to move it down to its lowest position and move it up (at steps S5, S6), and detects the level of the S-shaped signal generated on FE (at step S7). The DSP 34 starts filter operation for focusing, delivers a drive signal to the DA converter 35, and the focus control loop is closed (at step S8). Furthermore, the tracking control loop is closed (at step S9), address information on the disk 12 is read (at step S10), a search operation is carried out to move the light beam to the desired track, necessary information (TOC information and the like) is read, and a standby condition is reached (at step S11).

If no disk has been loaded, no signal is generated (at step S16), it is determined that there is "NO DISK" and the laser light is turned off, and a condition of waiting for disk loading is reached (at step S17).

In the case that a high-density disk, SD, has been loaded, when the laser with the longer wavelength is turned on, the amplitude of the S-shaped signal generated on FE becomes smaller than the predetermined value as shown in FIG. 4 (at step S4). On the basis of the amplitude, the DSP 34 determines that the loaded disk 12 is not CD or CD-R, drives the converging lens 10 to move it down to its lowest position, sends an OFF signal to the laser drive circuit 3 and sends an ON signal to the laser drive circuit 4, whereby the laser 1 with a wavelength of 780 nm is turned off (at step 12), and the laser 2 with a wavelength of 650 nm is turned on (at step S13). When the converging lens 10 is moved up and down again in this condition (at step S14), the level of the S-shaped signal generated on FE becomes higher than a predetermined comparison value (a ) (at step S15). (If the level is lower than the predetermined value a, the conditions at steps S19 and S17 are reached). The DSP 34 detects the level and determines that the loaded disk is SD (at step S18), and drives the converging lens 10 so as to move it down again to its lowest position. The DSP 34 drives the converging lens 10 so as to moved it up again (at steps S20, S21), and detects the level of the S-shaped signal generated on FE (at step S22), starts filter operation for focusing, delivers a drive signal to the DA converter 35, and the focus control loop is closed (at S23). Furthermore, the tracking control loop is closed (at step S24), address information on the disk 12 is read (at step S25), a search operation is carried out to move the light beam to the desired track, necessary information (control track information and the like) is read, and a standby condition is reached (at step S26). In addition, to cope with variations in the reflectance of the disk and the like, the S-shaped amplitude generated during the downward movement of the converging lens 10 is measured before the amplitude level of the S-shaped signal is detected, and the gain of a multiplier (not shown) or an attenuator (not shown) in the DSP 34 is switched so that the amplitude becomes the predetermined amplitude. By attaining the above-mentioned configuration, focus control can be pulled in stably for both CD and SD, and start time is not lengthened so much.

Figure 6:
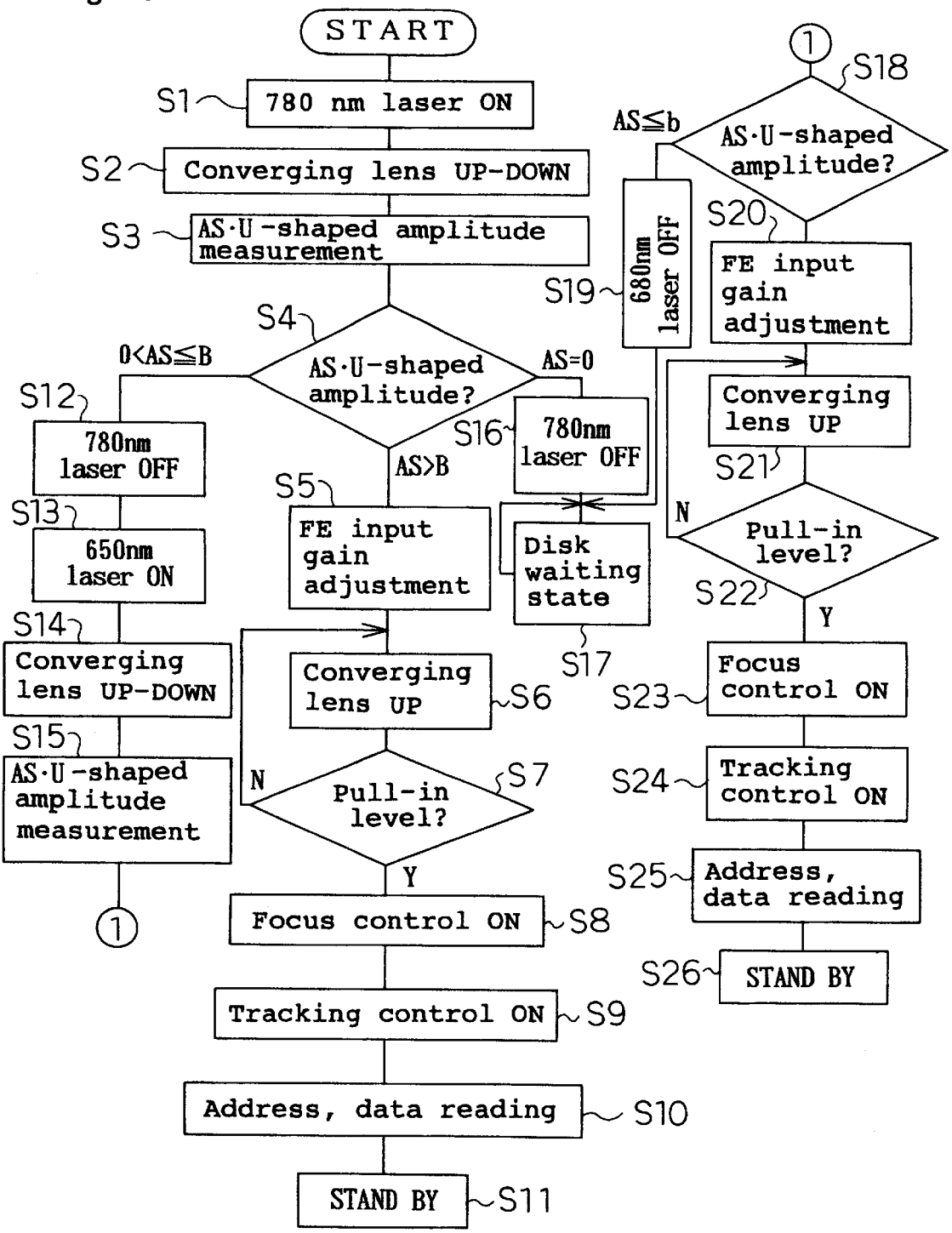
FIG. 6 is a flowchart showing a starting procedure in accordance with a second embodiment of the present invention.

Next, the second embodiment will be described below. Just as in the case of the first embodiment, as shown in FIGS. 3 and 4, the laser 1 with a longer wavelength of 780 nm has characteristics suited for CD, and the laser 2 with a shorter wavelength of 650 nm has characteristics suited for SD. However, if there is almost no difference between CD and SD in the outer dimensions, it is unknown which laser should be turned on. Therefore, as shown in FIG. 6, a signal is first sent from the DSP 34 to the laser control circuit 3 to turn on the laser light 1 with the longer wavelength (at step S1). Next, the converging lens 10 is moved up and down. If CD or CD-R has been loaded in the apparatus at this time, the amplitude of a U-shaped signal generated on AS becomes larger than a predetermined comparison value as shown in FIG. 3 (at steps S2, S3). On the basis of the amplitude, the DSP 34 determines that the loaded disk 12 is CD or CD-R, drives the converging lens 10 so as to move it down to its lowest position and move it up (at steps S5, S6), and detects the level of the S-shaped signal generated on FE (at step S7). The DSP 34 starts filter operation for focusing, delivers a drive signal to the DA converter 35, and the focus control loop is closed (at step S8). Furthermore, the tracking control loop is closed (at step S9), address information on the disk 12 is read, a search operation is carried out to move the light beam to the desired track, necessary information (TOC information and the like) is read (at step S10), and a standby condition is reached .

If no disk has been loaded, no signal is generated (at step S4), it is determined that there is "NO DISK" and the laser light is turned off, and a condition of waiting for disk loading is reached (at steps S16, S17).

In the case that a high-density disk, SD, has been loaded, the amplitude of the U-shaped signal generated on AS becomes smaller than the predetermined value as shown in FIG. 4 (at step S4). On the basis of the amplitude, the DSP 34 determines that the loaded disk 12 is not CD or CD-R, drives the converging lens 10 to move it down to its lowest position, sends an OFF signal to the laser drive circuit 3 and sends an ON signal to the laser drive circuit 4, whereby the laser 1 with a wavelength of 780 nm is turned off (at step 12), and the laser 2 with a wavelength of 650 nm is turned on (at step S13). When the converging lens 10 is moved up and down again in this condition (at step S14), the level of the U-shaped signal generated on AS becomes higher than a predetermined value b. (If the level is lower than a predetermined comparison value b, the conditions at steps S19 and S17 are reached). The DSP 34 detects the level (at steps S15, S18) and determines that the loaded disk is SD, and drives the converging lens 10 so as to move it down again to its lowest position. The DSP 34 drives the converging lens 10 so as to moved it up again (at steps S20, S21), and detects the level of the S-shaped signal generated on FE (at step S22), starts filter operation for focusing, delivers a drive signal to the DA converter 35, and the focus control loop is closed (at S23). Furthermore, the tracking control loop is closed (at step S24), address information on the disk 12 is read (at step S25), a search operation is carried out to move the light beam to the desired track, necessary information (control track information and the like) is read, and a standby condition is reached (at step S26).

In addition, to cope with variations in the reflectance of the disk and the like, the U-shaped amplitude on AS generated during the downward movement of the converging lens 10 is measured before the amplitude level of the S-shaped signal on FE is detected, and the gain of a multiplier (not shown) or an attenuator (not shown) for AS in the DSP 34 is switched so that the amplitude becomes the predetermined amplitude. Furthermore, by switching the gain of the multiplier (not shown) or the attenuator (not shown) for FE in the DSP by the amount of the ratio of the gains, focus control can be pulled in stably for both CD and SD, and start time is not lengthened so much.

Figure 7:
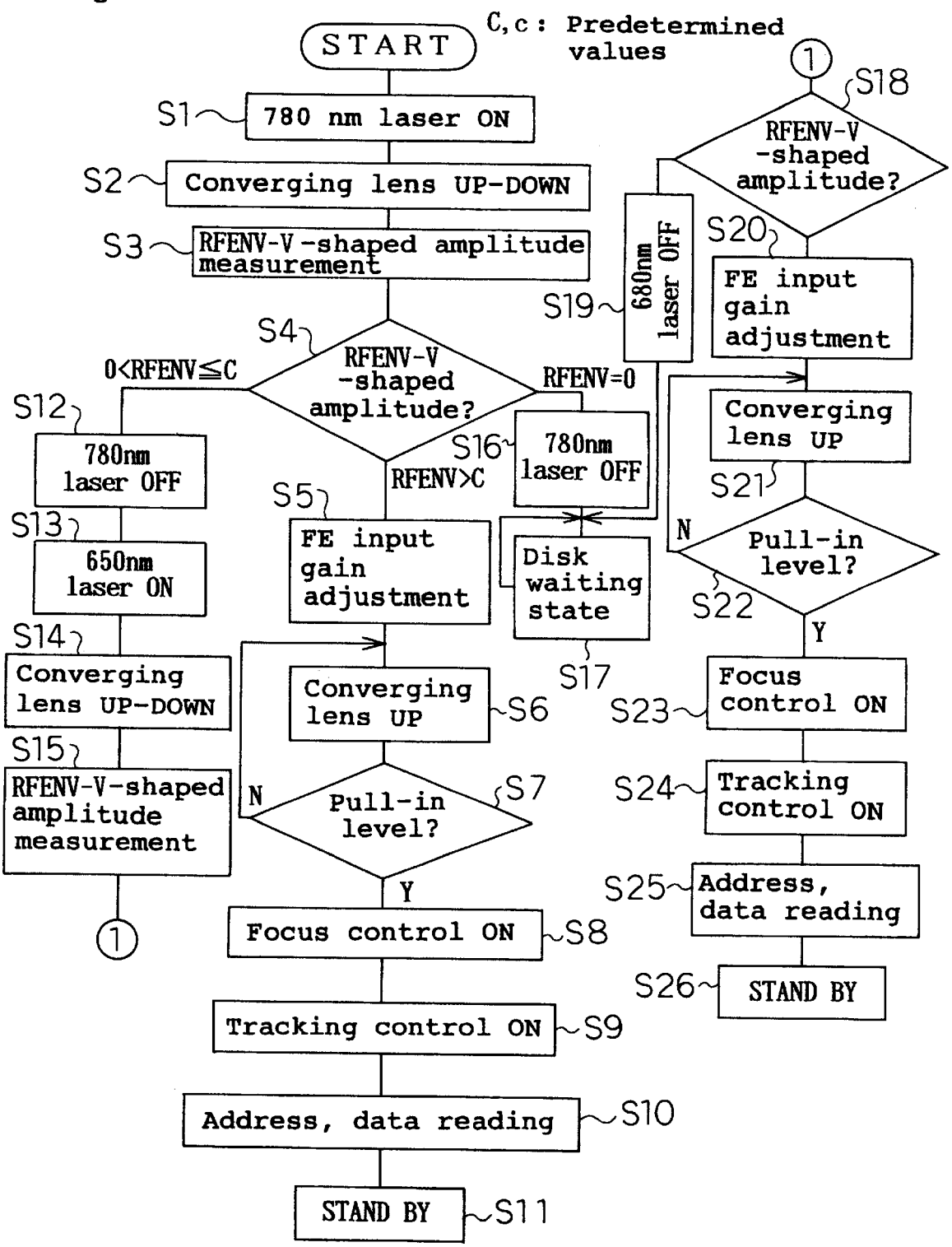
FIG. 7 is a flowchart showing a starting procedure in accordance with a third embodiment of the present invention.

Next, the third embodiment will be described below. Just as in the cases of the first and second embodiments, as shown in FIGS. 3 and 4, the laser with a longer wavelength of 780 nm has characteristics suited for CD, and the laser 2 with a shorter wavelength of 650 nm has characteristics suited for SD. However, if there is almost no difference between CD and SD in the outer dimensions, it is unknown which laser should be turned on. Therefore, as shown in FIG. 7, a signal is first sent from the DSP 34 to the laser control circuit 3 to turn on the laser light 1 with the longer wavelength (at step S1). Next, the converging lens 10 is moved up and down (at step S2). If CD or CD-R has been loaded in the apparatus at this time, the amplitude of a V-shaped signal generated on RFENV becomes larger than a predetermined comparison value as shown in FIG. 3 (at steps S3, S4). On the basis of the amplitude, the DSP 34 determines that the loaded disk 12 is CD or CD-R, drives the converging lens 10 so as to move it down to its lowest position and move it up (at steps S5, S6), and detects the level of the S-shaped signal generated on FE or the peak level of the RFENV signal. The DSP 34 starts filter operation for focusing, delivers a drive signal to the DA converter 35, and the focus control loop is closed (at step S8). Furthermore, the tracking control loop is closed (at step S9), address information on the disk 12 is read (at step S10), a search operation is carried out to move the light beam to the desired track, necessary information (TOC information and the like) is read, and a standby condition is reached (at step S11). If no disk has been loaded, no signal is generated, it is determined that there is "NO DISK" and the laser light is turned off, and a condition of waiting for disk loading is reached.

In the case that a high-density disk, SD, has been loaded, the amplitude of the V-shaped signal generated on RFENV becomes smaller than the predetermined value as shown in FIG. 4 (at step S4). On the basis of the amplitude, the DSP 34 determines that the loaded disk 12 is not CD or CD-R, drives the converging lens 10 to move it down to its lowest position, sends an OFF signal to the laser drive circuit 3 and sends an ON signal to the laser drive circuit 4, whereby the laser 1 with a wavelength of 780 nm is turned off (at step 12), and the laser 2 with a wavelength of 650 nm is turned on (at step S13). When the converging lens 10 is moved up and down again in this condition (at step S14), the level of the V-shaped signal generated on RFENV becomes higher than a predetermined comparison value c (at step S15). (If the level is lower than the predetermined value c, the conditions at steps S19 and S17 are reached). The DSP 34 detects the level and determines that the loaded disk is SD (at step S18), and drives the converging lens 10 so as to move it down again to its lowest position. The DSP 34 drives the converging lens 10 so as to moved it up again (at steps S20, S21), and detects the level of the S-shaped signal generated on FE or the peak level of the RFENV signal (at step S22), starts filter operation for focusing, delivers a drive signal to the DA converter 35, and the focus control loop is closed (at S23). Furthermore, the tracking control loop is closed (at step S24), address information on the disk 12 is read (at step S25), a search operation is carried out to move the light beam to the desired track, necessary information (control track information and the like) is read, and a standby condition is reached (at step S26).

In addition, to cope with variations in the reflectance of the disk and the like, the V-shaped amplitude on RFENV generated during the downward movement of the converging lens 10 is measured before the amplitude level of the S-shaped signal on FE or the peak level of RFENV is detected, and the gain of a multiplier (not shown) or an attenuator (not shown) for RFENV in the DSP 34 is switched so that the amplitude becomes the predetermined amplitude. Furthermore, by switching the gain of the multiplier (not shown) or the attenuator (not shown) for FE in the DSP by the amount of the ratio of the gains, focus control can be pulled in stably for both CD and SD, and start time is not lengthened so much.

In the above-mentioned first to third embodiments, when the laser with a wavelength of 650 nm is turned on after it is determined that the loaded disk is not CD or CD-R, the emission power of the laser is lowered to the extent that the information on CD-R is not erased, a predetermined pull-in level and a gain corresponding to the emission power are set, and the power is returned to its specified level after it is finally confirmed that the loaded disk is not CD-R. By this setting, the reliability of the embodiments can be improved further.

In addition, it is possible to use a configuration, wherein the measured value of the amplitude of FE in the first embodiment, the measured value of the amplitude of AS in the second embodiment and the measured value of the amplitude of RFENV in the third embodiment are combined and subjected to arithmetic operation so as to generate a difference depending on the type of disk, and initial setting values to be switched depending on the type of disk as well as the type of laser are set on the basis of the arithmetic operation result.

Furthermore, in the first to third embodiments of the present invention, two lasers with wavelengths of 780 nm and 650 nm are taken as examples. However, the present invention can also be applied to three or more lasers with different wavelengths by sequentially switching the above-mentioned procedures. Moreover, the present invention can also be applied to a laser with a wavelength of 650 nm or 635 nm, and a blue laser with a shorter wavelength. The present invention is thus not limited at all with respect to the wavelength.

In addition, a laser with a longer wavelength can be switched very quickly to a laser with a shorter wavelength, provided that focus control remains activated, and start time can be shortened. In particular, if the position of focus is shifted by a certain amount due to the difference in the substrate thickness or the like, stable switching can be attained by performing addition or subtraction of an offset value in the focus control system immediately before switching.

Furthermore, when a disk, such as CD, is loaded in a desktop personal computer, the disk is mechanically clamped and loaded in ordinary cases. Therefore, if the spindle is rotated with no disk, the turntable on the spindle motor side may make contact with the clamp on the opposite side, thereby resulting in the possibility of noise or breakage.

To solve the problem, as a fourth embodiment, in a condition wherein the spindle motor is stopped, that is, the loaded disk is stationary, a signal is first sent from the DSP 34 to the laser control circuit 3, and the laser 1 with the longer wavelength is turned on. Next, the converging lens 10 is moved up and down. If CD or CD-R has been loaded in the apparatus at this time, the amplitude of the S-shaped signal generated on FE and the amplitude of the U-shaped signal generated on AS become larger than their predetermined values as shown in FIG. 3 even when the disk is stationary. On the basis of this condition, the DSP 34 determines that the loaded disk 12 is CD or CD-R. If the levels of the signals are lower than their respective predetermined values, the DSP 34 determines that the loaded disk 12 is SD, or no disk is loaded. The DSP 34 drives the converging lens 10 so as to move it to its lowest position, sends an OFF signal to the laser drive circuit 3, sends an ON signal to the laser drive circuit 4, whereby the laser 1 with a wavelength of 780 nm is turned off, and the laser 2 with a wavelength of 650 nm is turned on. The converging lens 10 is moved up and down in this condition. If the amplitude of the S-shaped signal generated on FE and the amplitude of the U-shaped signal generated on AS become larger than their respective predetermined values, the DSP 34 determines that the loaded disk is SD. In addition, if the levels of the signals are smaller than their predetermined values, the DSP 34 determines that "NO DISK" is loaded, and a condition of waiting for disk loading is reached.

When it is determined that a disk is present, the DSP 34 rotates the spindle motor, and makes distinction again to determine the type of the disk in accordance with one of the first to third embodiments, whereby the spindle motor can be prevented from being damaged, and the accuracy of distinction can be improved.

Figure 14:
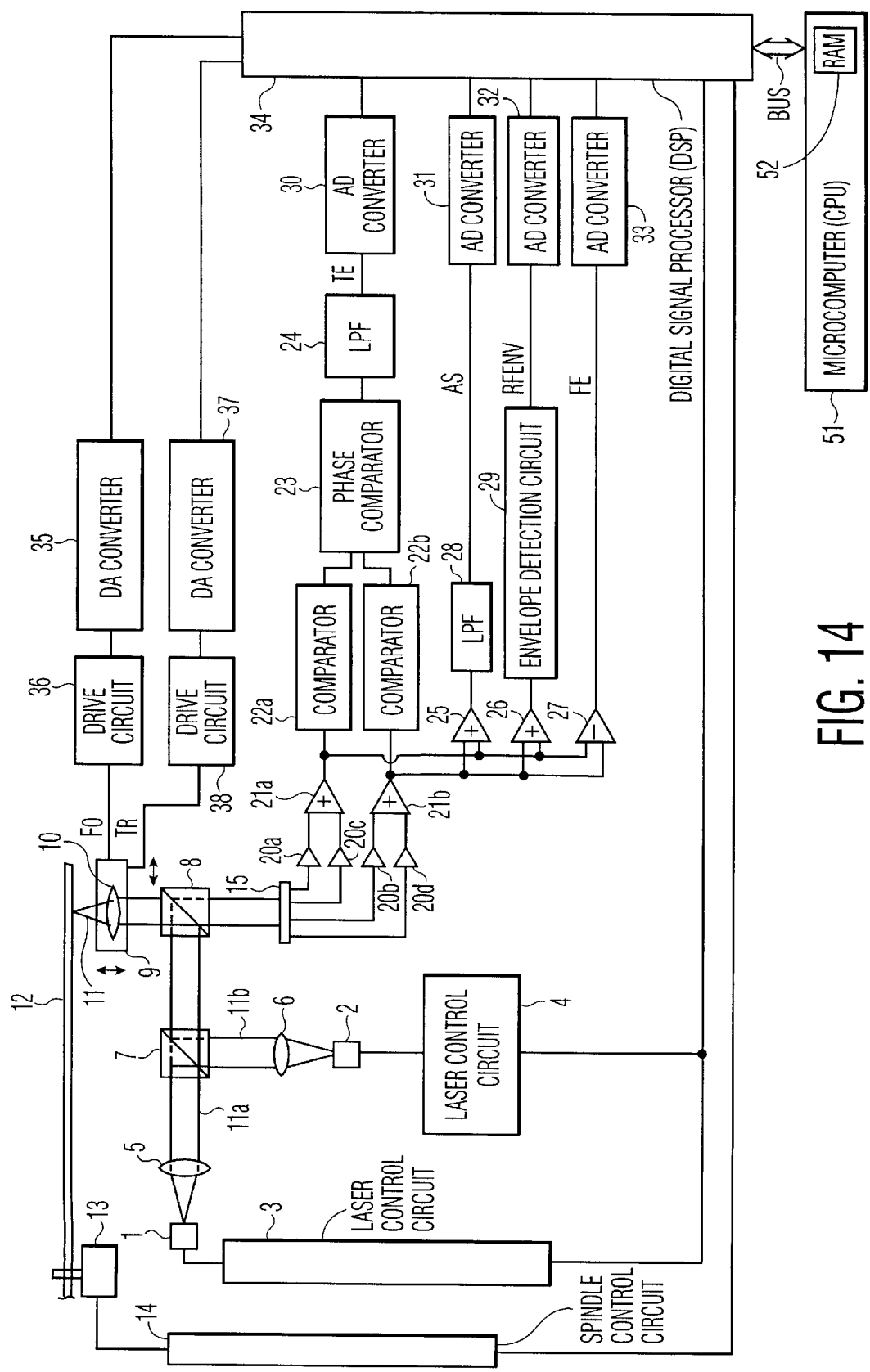
FIG. 14 is a block diagram showing an configuration of an optical disk in accordance with fifth to seventh embodiments of the present invention.
Figure 15:
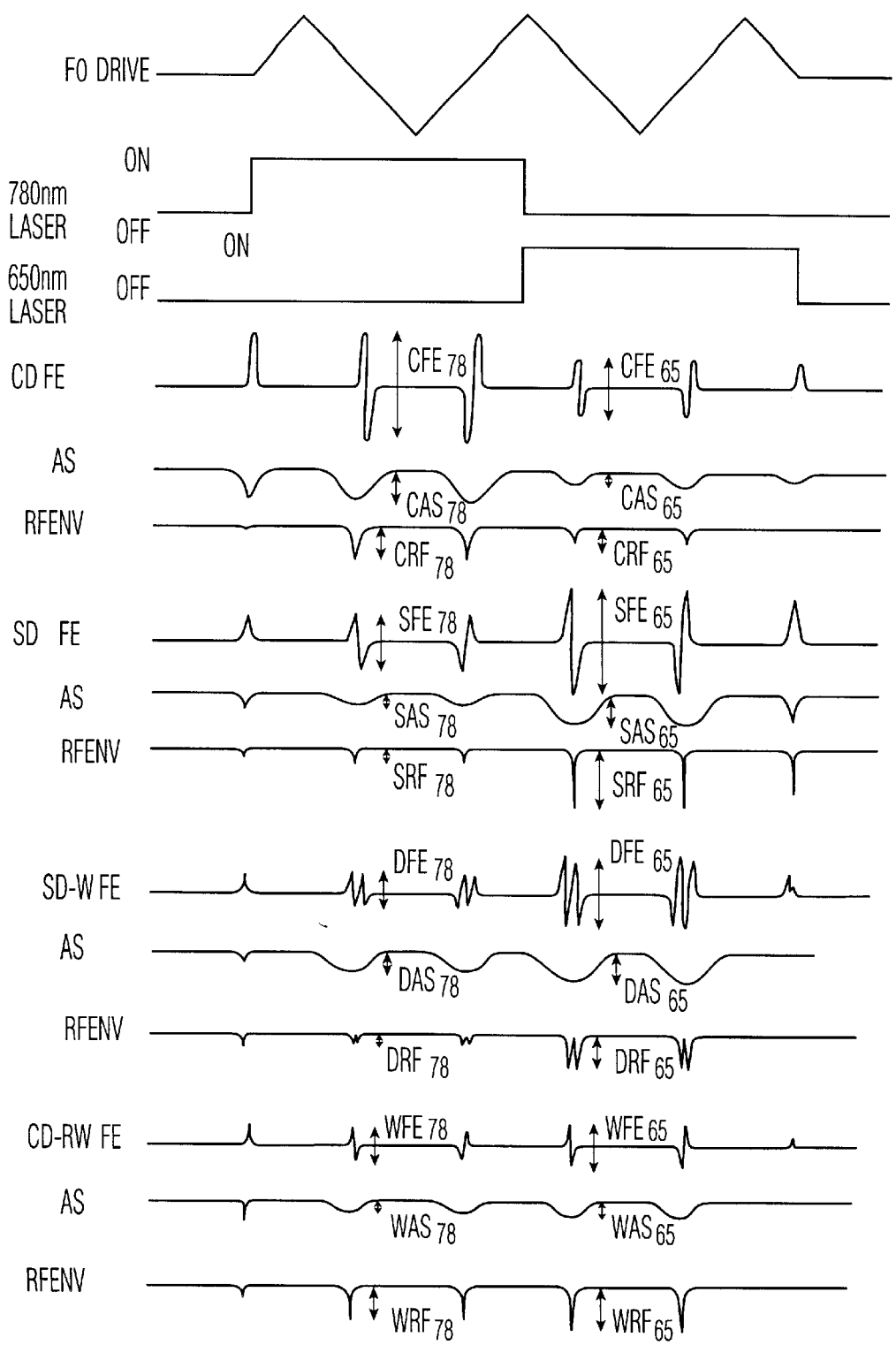
FIG. 15 shows waveforms of signals which are obtained when each of a conventional CD and a novel high-density disk is loaded in the optical disk apparatus in accordance with the fifth to seventh embodiments of the present invention and when the light of each of lasers with different wavelengths is converged and cast.

As described earlier, a variety of disks having the same outer dimensions, such as next-generation disks and recordable CD, have recently been proposed and standardized. Fifth, sixth and seventh embodiments relate to actual methods of making distinction to determine the type of disk. With these methods, information can be recorded to or reproduced from various disks by using a single drive. FIG. 14 is a block diagram showing a configuration for attaining the fifth, sixth and seventh embodiments. These fifth, sixth and seventh embodiments can also be attained by using the DSP 34 just as in the cases of the first to fourth embodiments and by using the programs of a microcomputer 51 for controlling the entire apparatus. In addition, just as in the cases of FIGS. 3 and 4, FIG. 15 shows the waveforms of FE, AS and RF which are obtained when the laser light with a wavelength of 780 nm and the laser light with a wavelength of 650 nm are each emitted and cast to CD, single-layer SD having a density higher than that of CD, dual-layer SD-W having a capacity larger than that of SD, and CD-RW, i. e., rewritable CD. The fifth, sixth and seventh embodiments will be described below referring to FIGS. 14 and 15.

The fifth embodiment will be described below. When it is assumed that the apparatus in accordance with the fifth embodiment can play back four types of disks, such as conventional CD, SD, SD-W and CD-RW, for example, a signal is first sent from the DSP 34 to the laser control circuit 3 to turn on the laser light 1 with a longer wavelength. Next, the converging lens 10 is moved up and down. If a disk has been loaded in the apparatus at this time, the amplitude of the S-shaped signal generated on FE becomes different depending on the type of disk as shown in FIG. 15. The amplitude value (MAX or MIN value) of the FE signal is fed to the DSP 34 via the AD converter 33, the value is delivered to the microcomputer (CPU) 51 via a bus, and the CPU 51 stores the delivered amplitude value of FE in the RAM built therein. Usually, the distinction between CD and CD-R can be made by using only the amplitude value of FE when the laser with the longer wavelength is used. Hereafter, the DSP 34 drives the converging lens 10 so as to move it to its lowest position and move it up, and detects the level of the S-shaped signal generated on FE, or detects the peak level of signal RFENV. The DSP 34 starts filter operation for focusing, delivers a drive signal to the DA converter 35, and the focus control loop is closed. Furthermore, the tracking control loop is closed, address information on the disk 12 is read, a search operation is carried out to move the light beam to the desired track, necessary information (TOC information and the like) is read, and a standby condition is reached.

In the cases other than CD, CD-R, a signal is sent from the DSP 34 to the laser control circuit 4 to turn on a laser light 2 with a shorter wavelength. Next, the converging lens 10 is moved up and down. The amplitude of the S-shaped signal generated on FE is different depending on the type of disk as shown in FIG. 15. The amplitude is also different from that of signal FE obtained when the laser light with a longer wavelength of 780 nm is cast. Just as in the case of the laser with a wavelength of 780 nm, the amplitude value (MAX or MIN value) of the signal FE is fed to the DSP 34 via the AD converter 33, the value is delivered to the microcomputer (CPU) 51 via the bus, and the CPU 51 stores the delivered amplitude value of FE in the RAM built therein.

The CPU 51 carries out subtraction of the stored FE values at the wavelengths (Subtraction is basically desirable because of ease of processing. The processing, however, is not limited to subtraction in the present invention.), and compares the result of the subtraction with a predetermined distinction value to determine whether the type of the disk currently loaded is SD, SD-W or CD-RW.

FIG. 16 shows the amplitude values of signals which are obtained when the laser light with a wavelength of 780 nm and the laser light with a wavelength of 650 nm are cast to each type of disk and the converging lens is moved up and down so as to obtain the graphs shown in FIG. 15, and FIG. 16 also shows distinction values corresponding to the amplitude values. As shown in FIGS. 15 and 16 (1), in the case of SD (single-layer), the amplitude value of FE at 780 nm has been stored as SFE78, and the amplitude value of FE at 650 nm has been stored as SFE65. The difference between these amplitude values is obtained by subtraction and compared with predetermined levels FA and FB. If the difference is in the range of FB to FA, the disk can be identified as SD (single-layer). In addition, in the case of SD-W (dual-layer), the amplitude value of FE at 780 nm has been stored as DFE78, and the amplitude of FE at 650 nm has been stored as DFE65. The difference between these amplitude values is obtained by subtraction and compared with predetermined levels FB and FC. If the difference is in the range of FC to FB, the disk can be identified as SD-W (dual-layer). Furthermore, in the case of CD-RW, the amplitude value of FE at 780 nm has been stored as WFE78, and the amplitude value of FE at 650 nm has been stored as WFE65. The difference between these amplitude values is obtained by subtraction and compared with a predetermined level FC. If the difference is smaller than FC, the disk can be identified as CD-RW.

The sixth embodiment will be described below. When it is assumed that the apparatus in accordance with the sixth embodiment can play back four types of disks, such as conventional CD, SD, SD-W and CD-RW, for example, just as in the case of the apparatus in accordance with the fifth embodiment, a signal is first sent from the DSP 34 to the laser control circuit 3 to turn on the laser light 1 with a longer wavelength. Next, the converging lens 10 is moved up and down. If a disk has been loaded in the apparatus at this time, the amplitude of the U-shaped signal generated on AS becomes different depending on the type of disk as shown in FIG. 15. The amplitude value (MAX or MIN value) of signal AS is fed to the DSP 34 via the AD converter 33, the value is delivered to the microcomputer (CPU) 51 via the bus, and the CPU 51 stores the delivered amplitude value of AS in the RAM built therein. Usually, the distinction between CD and CD-R can be made by using only the amplitude value of AS when the laser with the longer wavelength is used. Hereafter, the DSP 34 drives the converging lens 10 so as to move it to its lowest position and move it up, and detects the level of the S-shaped signal generated on FE, or detects the peak level of signal RFENV. The DSP 34 starts filter operation for focusing, delivers a drive signal to the DA converter 35, and the focus control loop is closed. Furthermore, the tracking control loop is closed, address information on the disk 12 is read, a search operation is carried out to move the light beam to the desired track, necessary information (TOC information and the like) is read, and a standby condition is reached. Next, in the cases other than CD, CD-R, a signal is sent from the DSP 34 to the laser control circuit 4 to turn on the laser light 2 with the shorter wavelength. Next, the converging lens 10 is moved up and down. The amplitude of the U-shaped signal generated on AS is different depending on the type of disk as shown in FIG. 15. The amplitude is also different from that of the signal AS obtained when the laser light with a longer wavelength of 780 nm is cast. Just as in the case of the laser with a wavelength of 780 nm, the amplitude value (MAX or MIN value) of the signal AS is fed to the DSP 34 via the AD converter 33, the value is delivered to the microcomputer (CPU) 51 via the bus, and the CPU 51 stores the delivered amplitude value of AS in the RAM built therein.

The CPU 51 carries out subtraction of the stored AS values at the wavelengths (Subtraction is basically desirable because of ease of processing. The processing, however, is not limited to subtraction in the present invention.), and compares the result of the subtraction with a predetermined distinction value to determine whether the type of the disk currently loaded is SD, SD-W or CD-RW.

As described earlier, FIG. 16 shows the amplitude values of signals which are obtained when the laser light with a wavelength of 780 nm and the laser light with a wavelength of 650 nm are cast to each type of disk and the converging lens is moved up and down so as to obtain the graphs shown in FIG. 15, and also shows distinction values corresponding to the amplitude values. As shown in FIGS. 15 and 16 (2), in the case of SD (single-layer), the amplitude value of AS at 780 nm has been stored as SAS78, and the amplitude value of AS at 650 nm has been stored as SAS65. The difference between these amplitude values is obtained by subtraction and compared with predetermined levels AA and AB. If the difference is in the range of AB to AA, the disk can be identified as SD(single-layer). In addition, in the case of SD-W (dual-layer), the amplitude value of AS at 780 nm has been stored as DAS78, and the amplitude of AS at 650 nm has been stored as DAS65. The difference between these amplitude values is obtained by subtraction and compared with predetermined levels AB and AC. If the difference is in the range of AC to AB, the disk can be identified as SD-W (dual-layer). Furthermore, in the case of CD-RW, the amplitude value of AS at 780 nm has been stored as WAS78, and the amplitude value of AS at 650 nm has been stored as WAS65. The difference between these amplitude values is obtained by subtraction and compared with a predetermined level AC. If the difference is smaller than AC, the disk can be identified as CD-RW.

The seventh embodiment will be described below. When it is assumed that the apparatus in accordance with the seventh embodiment can play back four types of disks, such as conventional CD, SD, SD-W and CD-RW, for example, just as in the cases of the apparatuses in accordance with the fifth and sixth embodiments, a signal is first sent from the DSP 34 to the laser control circuit 3 to turn on the laser 1 with a longer wavelength. Next, the converging lens 10 is moved up and down. If a disk has been loaded in the apparatus at this time, RF is generated as shown in FIG. 15. However, via an envelope detection circuit 29, a V-shaped signal is generated on the output signal RFENV of the envelope detection circuit 29, and the amplitude of the V-shaped signal becomes different depending on the type of disk. The amplitude value (MAX or MIN value) of the signal RFENV is fed to the DSP 34 via the AD converter 33, the value is delivered to the microcomputer (CPU) 51 via a bus, and the CPU 51 stores the delivered amplitude value of RFENV in the RAM built therein. Usually, the distinction between CD and CD-R can be made by using only the amplitude value of the signal RFENV when the laser with the longer wavelength is used. Hereafter, the DSP 34 drives the converging lens 10 so as to move it to its lowest position and move it up, and detects the level of the S-shaped signal generated on FE, or detects the peak level of the signal RFENV. The DSP 34 starts filter operation for focusing, delivers a drive signal to the DA converter 35, and the focus control loop is closed. Furthermore, the tracking control loop is closed, address information on the disk 12 is read, a search operation is carried out to move the light beam to the desired track, necessary information (TOC information and the like) is read, and a standby condition is reached. Next, in the cases other than CD, CD-R, a signal is sent from the DSP 34 to the laser control circuit 4 to turn on a laser light 2 with a shorter wavelength. Next, the converging lens 10 is moved up and down. The amplitude of the V-shaped signal generated on RFENV is different depending on the type of disk as shown in FIG. 15. The amplitude is also different from that of the signal RFENV obtained when the laser light with a longer wavelength of 780 nm is cast. Just as in the case of the laser with a wavelength of 780 nm, the amplitude value (MAX or MIN value) of the signal RFENV is fed to the DSP 34 via the AD converter 33, the value is delivered to the microcomputer (CPU) 51 via the bus, and the CPU 51 stores the delivered amplitude value of RFENV in the RAM built therein.

The CPU 51 carries out subtraction of the stored RFENV values at the wavelengths (Subtraction is basically desirable because of ease of processing. The processing, however, is not limited depending on the kind of arithmetic operation in the present embodiment.), and compares the result of the subtraction with a predetermined distinction value to determine whether the type of the disk currently loaded is SD, SD-W or CD-RW.

FIG. 16 shows the amplitude values of signals which are obtained when the laser light with a wavelength of 780 nm and the laser light with a wavelength of 650 nm are cast to each type of disk and the lens is moved up and down so as to obtain the graphs shown in FIG. 15, and also shows distinction values corresponding to the amplitude values. As shown in FIGS. 15 and 16 (3), in the case of SD (single-layer), the amplitude value of RFENV at 780 nm has been stored as SRF78, and the amplitude value of RFENV at 650 nm has been stored as SRF65. The difference between these amplitude values is obtained by subtraction and compared with predetermined levels RA and RB. If the difference is in the range of RB to RA, the disk can be identified as SD (single-layer). In addition, in the case of SD-W (dual-layer), the amplitude value of RFENV at 780 nm has been stored as DRF78, and the amplitude of RFENV at 650 nm has been stored as DRF65. The difference between these amplitude values is obtained by subtraction and compared with pre-determined levels RB and RC. If the difference is in the range of RC to RB, the disk can be identified as SD-W (dual-layer). Furthermore, in the case of CD-RW, the amplitude value of RFENV at 780 nm has been stored as WRF78, and the amplitude value of RFENV at 650 nm has been stored as WRF65. The difference between these amplitude values is obtained by subtraction and compared with a predetermined level RC. If the difference is smaller than FC, the disk can be identified as CD-RW.

Furthermore, by combining the fifth, sixth and seventh embodiments, the accuracy of distinction can be improved, various optical heads can be used, and it becomes possible to make distinction among a wider variety of disks. For example, the DSP 34 is configured so as to detect the amplitudes of the signals FE, AS, RFENV and TE, and the CPU stores all the amplitude values corresponding to the laser with each wavelength. A value obtained by dividing the amplitude of FE,RFENV,TE at the emission of the laser light with the longer wavelength by the amplitude of AS at the emission of the laser light with the shorter wavelength is compared with, that is, subtracted from a value obtained by dividing the amplitude of FE, RRENV, TE at the emission of the laser light with the shorter wavelength by the amplitude of AS at the emission of the laser light with the longer wavelength. Depending on the result, distinction is made to determine the type of disk. With this configuration, accurate distinction is made possible even if the reflectance of the disk is changed because of dirt and dust attached thereto.

Furthermore, in the cases of a read-only disk (ROM) having tracks of pits and a recordable disk (RAM) having tracks of guide grooves and wobble signals, differences are caused in the amplitude and the S/N ratio of the track error signal (TEpp) detected by the push-pull method, and differences are also caused in the amplitude and the S/N ratio of the track error signal (TEph) detected by the phase contrast method. Therefore, by activating the focus control, and by detecting the amplitude of each of the signals TE or the pulse width of noise at the time of binary representation, the distinction between a ROM disk and a RAM disk may be made depending on the detected value. Moreover, the distinction may be made depending on the level of a traverse signal (groove traverse signal) generated on FE when the beam of light traverses the track.

Additionally, in the case of a condition wherein data on CD-R is not erased (because of reasons regarding disk rotation stop, laser power, wavelength or the like), it is possible to cast light beams from both the lasers with the longer and shorter wavelengths to CD and CD-R and to capture signals for all the disks at both the wavelengths. With this configuration, it is possible to make distinction between the disks by one operation.

In the above-mentioned embodiments, the playback of disks CD (CD-R), SD, SD-W and CD-RW has been described. However, in an apparatus provided with two or more lasers with different wavelengths and used to play back two or more types of disks including currently available PD, MO and MD, as well as DVD and high-density MO to be available on the market in the future, for example, by applying these embodiments and by using light sources with appropriate wavelengths, the distinction among the disks can be made while the disks are protected.

Furthermore, just as in the cases of the first to third embodiments and the fourth embodiment, the sixth and seventh embodiments have been described by taking two lasers with wavelengths of 780 nm and 650 nm as examples. However, the present invention can be applied to two or more lasers with different wavelengths by sequentially switching the abovementioned procedures. Moreover, the present invention can also be applied to a laser with a wavelength of 650 nm or 635 nm, and a blue laser with a shorter wavelength. The present invention is thus not limited at all with respect to the wavelength.

In addition, the amplitude values of the signals are stored in the RAM built in the CPU in the above descriptions. However, the amplitude values may be stored in the RAM built in the DSP, if the capability of the DSP and the capacity of the RAM are sufficient. Besides, if large quantities of data are stored, an external RAM being accessible from the DSP or CPU may be provided.

Figure 8:
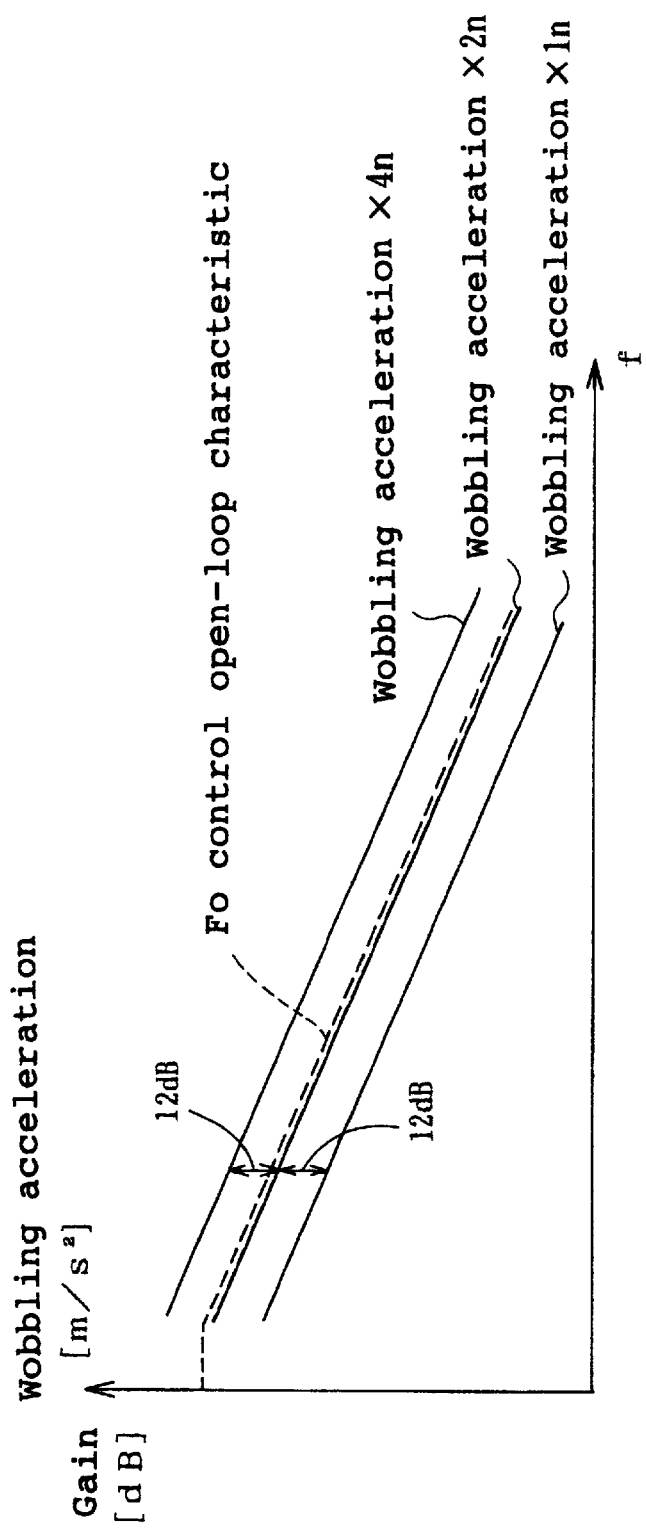
FIG. 8 is a graph showing disk wobbling acceleration and focus control open-loop frequency characteristics in accordance with the eighth and ninth embodiments of the present invention.
Figure 9:
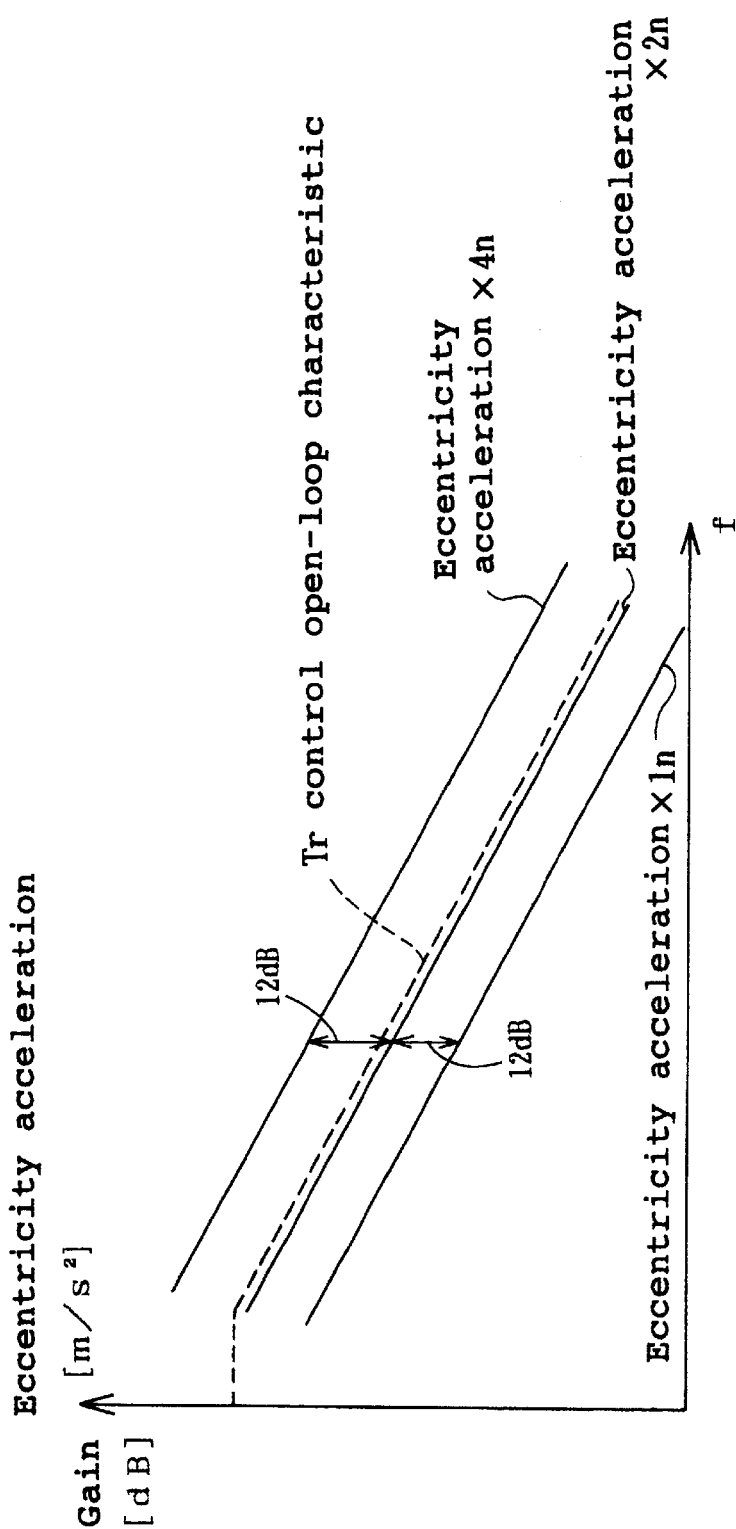
FIG. 9 is a graph showing disk eccentricity acceleration and focus control open-loop frequency characteristics in accordance with the eighth and ninth embodiments of the present invention.

Next, eighth and ninth embodiments relating to start procedures having features in the pull-in timing of focus control and tracking control will be described below referring to FIG. 1 together with FIGS. 8 and 9. FIG. 8 is a graph showing focus control open-loop gain characteristics and disk wobbling acceleration characteristics. FIG. 9 is a graph showing tracking control open-loop gain characteristics and disk eccentricity acceleration characteristics.

Just as in a case typically represented by CD, the time for the spindle motor to reach the desired rotation speed at the start of operation becomes longer as the playback speed, i.e., the rotation speed of the disk, increases. As the rotation speed increases, the wobbling acceleration and the eccentricity acceleration of the disk also increase in proportion to the square of the rotation speed. If the acceleration of the disk becomes higher in comparison with the servo control open-loop gain as shown in FIGS. 8 and 9, it is difficult to pull in focus control and tracking control.

Figure 10:
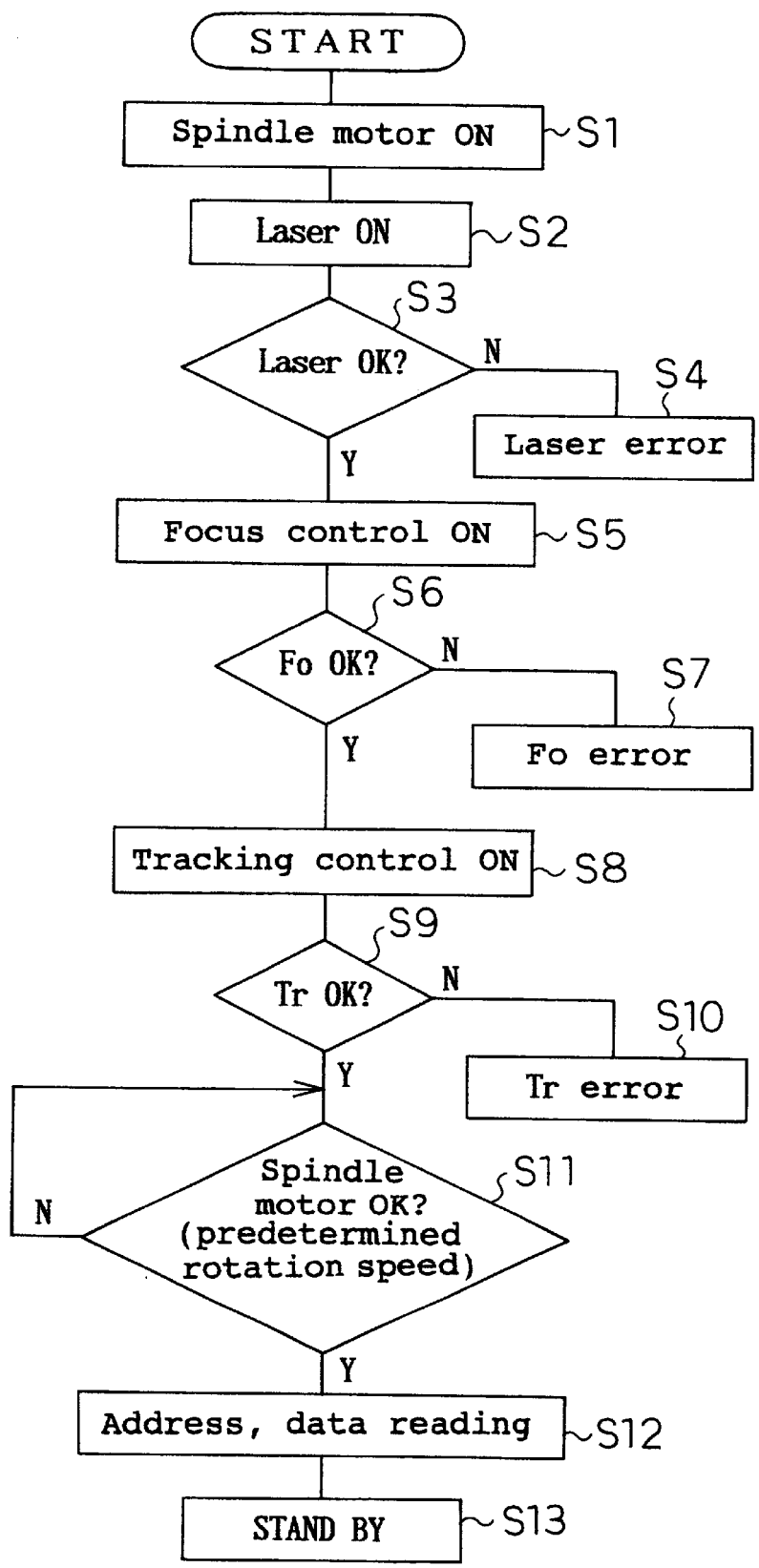
FIG. 10 is a flowchart showing a starting procedure in accordance with the eighth embodiment of the present invention.

FIG. 10 shows a starting procedure for an apparatus in accordance with the eighth embodiment. This procedure will be described below. When a disk is loaded in the apparatus, a starting step is performed by a microcomputer (not shown) for system control, and a spindle motor ON command is first sent from the microcomputer to the DSP 34. After receiving the spindle motor ON command from the microcomputer, the DSP 34 delivers an ON signal from a predetermined port, and starts the spindle motor 13 via the spindle control circuit 14 (at step S1). After the delivery of the command, the DSP 34 carries out speed control in accordance with FG from the spindle motor 13 so that the rotation speed of the spindle motor 13 becomes a predetermined value (at step S2). The time required to reach the predetermined rotation speed is in the range of 500 ms to 1500 ms. During this time, the microcomputer sends commands one after another to the DSP 34. In accordance with the commands, the DSP 34 performs laser ON (at steps S2, S4), focus control ON (at steps S5, S6, S7), tracking control ON (at steps S8, S9, S10, S11, S12). Since the laser ON time is several milliseconds, the rotation speed of the spindle motor is not yet raised to the predetermined value when focus control is begun to be pulled in. At this timing, focus control is pulled in immediately (at step S5). Next, tracking control is turned on. Since the time required for the pull-in of focus control is in the range of about 200 ms to 500 ms, the rotation speed of the spindle motor is still lower than the predetermined value even at the pull-in start time of tracking control, For this reason, the eccentricity acceleration and wobbling acceleration of the disk are within or nearly within the follow-up range of the open-loop gain of each type of control, and pull-in hardly ends in failure. In particular, in the case that the start time of the spindle motor is significantly short, learning is carried out, wherein the time required until one rotation speed value is raised to another value is measured, and the gain for drive is switched depending on the time (this relates to the ninth embodiment and detailed later). The embodiment is configured so that the focus control and tracking control are pulled in at the predetermined rotation speed during the learning.

Figure 11:
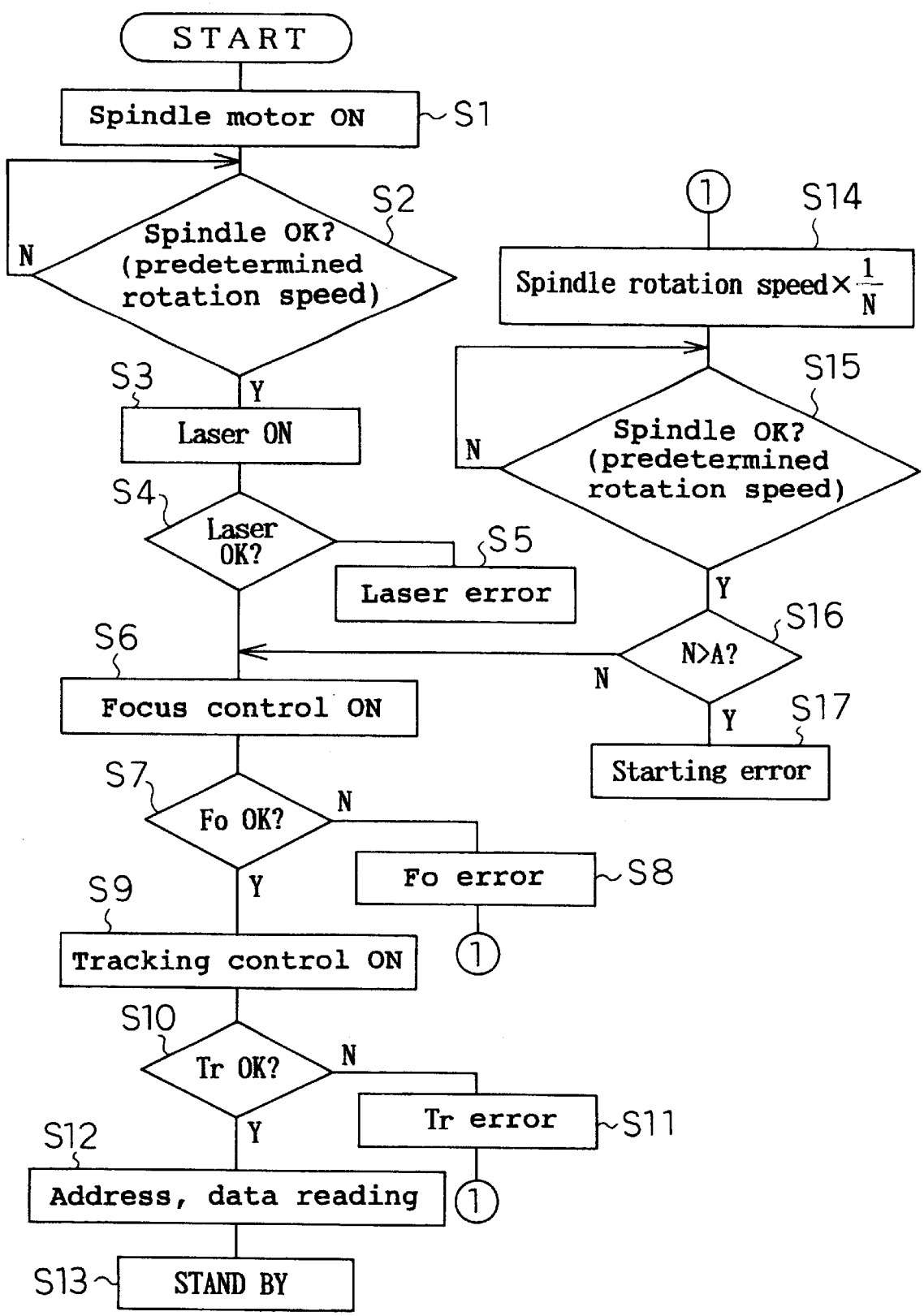
FIG. 11 is a flowchart showing a starting procedure in accordance with the ninth embodiment of the present invention.

FIG. 11 shows a starting procedure for an apparatus in accordance with the ninth embodiment. This procedure will be described below. When a disk is loaded in the apparatus, a starting step is performed by a microcomputer (not shown) for system control, and a spindle motor ON command is sent from the microcomputer to the DSP 34. After receiving the spindle motor ON command from the microcomputer, the DSP 34 delivers an ON signal from a predetermined port, and starts the spindle motor 13 via the spindle control circuit 14 (at step S13). After command delivery, the DSP 34 executes speed control in accordance with FG from the spindle motor 13 so that the rotation speed of the spindle motor 13 becomes a predetermined value (at step S2). After the rotation speed of the motor has reached the predetermined value, the DSP 34 performs laser ON (at steps S3, S4, S5), focus control ON (at steps S6, S7, S8), tracking control ON (at steps S9, S10, Si l) in accordance with the commands. At this time, in the case of a disk with little eccentricity and wobbling, focus control and tracking control are pulled in without problems, the desired track on the disk is searched, and necessary information is read, and a standby condition is reached (at steps S12, S13). However, if wobbling and eccentricity are significant, and the wobbling acceleration and eccentricity acceleration become large, focus control or tracking control cannot be pulled in. Accordingly, when the DSP 34 detects a focus control pull-in error or a tracking control pull-in error (at steps S8, S11), a target rotation speed delivered to the spindle motor is reset to a lower value (½ for example) (at steps S14, S15). The detection of a focus control pull-in error or a tracking control pull-in error can be attained by various methods. For example, a focus control pull-in error is generally detected by finding that the level of the RFENV signal is lower than its predetermined level, or by finding that no tracking error signal is present. In addition, a tracking control pull-in error is generally detected by finding that the count of the binary signals of the track error signals reaches a predetermined value or larger.

After the DSP 34 detects by using the signal a focus control pull-in error or a tracking control pull-in error to set the target rotation speed low and a rotation speed is lowered, the converging lens 10 is moved up and down again, and focus control is pulled in, and tracking control is pulled in. For example by decreasing the rotation speed by half, the wobbling acceleration and the eccentricity acceleration are reduced to one quarter, whereby control pull-in operation can be attained even when wobbling and eccentricity are relatively large. After the tracking control pull-in operation, the desired track is searched, the rotation speed is raised to the predetermined value while the predetermined control is executed, necessary information is read, and a standby condition is reached (at step S13).

Figure 12:
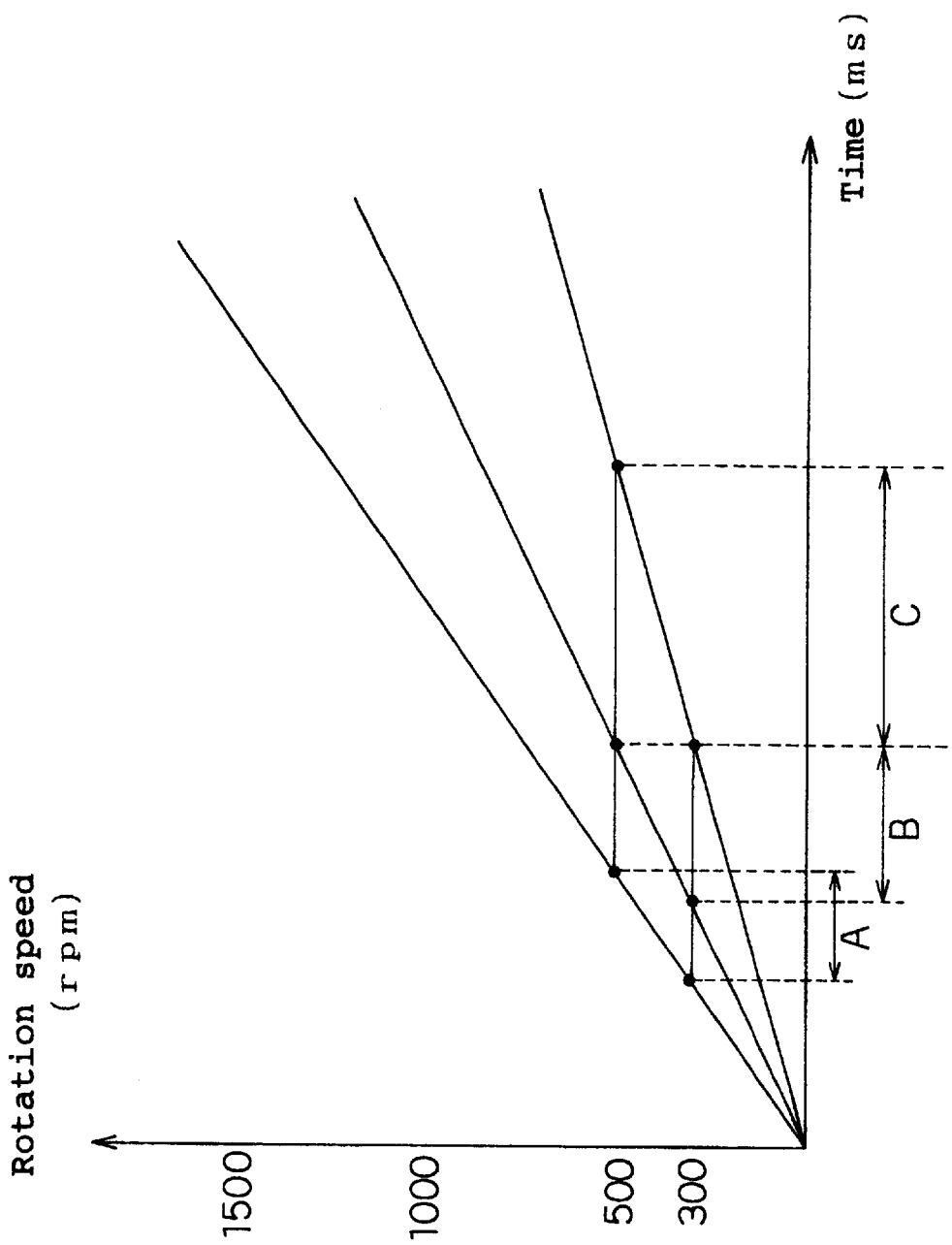
FIG. 12 is a graph showing characteristics regarding variations in the torque of a spindle motor and start time in accordance with the tenth embodiment of the present invention.

Next, the tenth embodiment of the present invention will be described below. FIG. 12 is a graph showing characteristics regarding variations in the start torque of a motor and start time until a certain rotation speed is reached.

Figure 13:
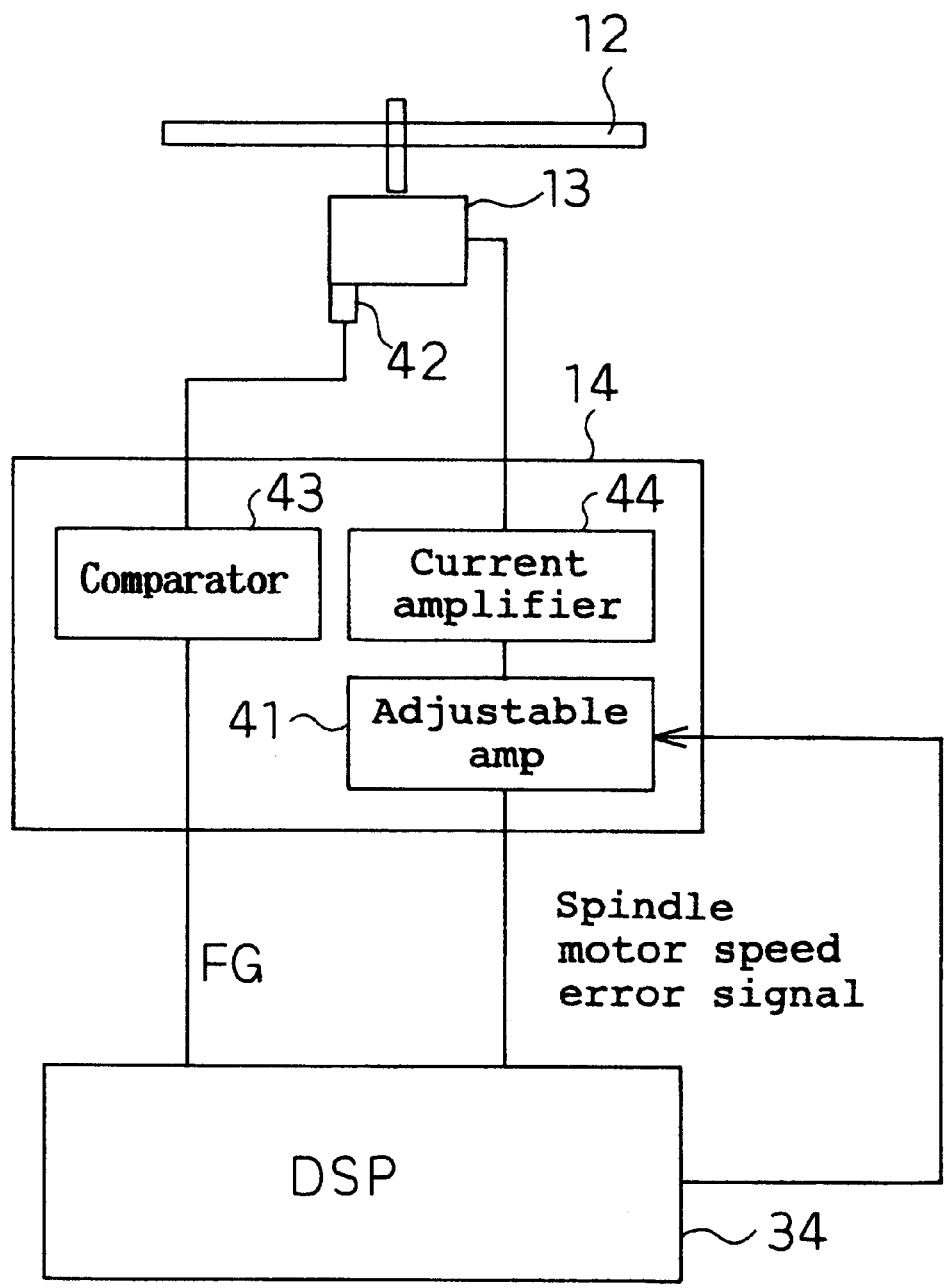
FIG. 13 is a block diagram showing the details of the spindle motor control portion of FIG. 1 in accordance with the tenth embodiment of the present invention.

As shown in FIG. 12, start time becomes different depending on variations in motor torque, and the variations in the torque cause variations in the gain of the rotation control system. As a result, the rotation speed is changed because of disturbance and the like, and jitter generates in reproduction signals. The tenth embodiment relates to a learning method for absorbing variations in the rotation system. FIG. 13 is a block diagram showing the details of the spindle motor 13, the spindle control circuit 14 and the DSP 34 shown in FIG. 1.

When a disk rotation command is sent from a CPU (not shown) to the DSP 34 at the start of the apparatus, the DSP 34 sends a rotation command to the spindle motor 13 via the spindle control circuit 14. Since the spindle motor is provided with a hall device, signal FG having N pulses per rotation (6 pulses in the present embodiment) is generated and supplied to the DSP 34. After the signal FG is supplied and when the period of the signal becomes a certain time value or less, the DSP 34 detects and determines whether the motor is stopped or rotated.

Furthermore, the DSP 34 calculates and sets the target period (target frequency) of FG with respect to the predetermined target rotation speed designated by the CPU, and delivers a drive signal to the spindle motor via the spindle control circuit 14 so that the incoming signal FG has the period (frequency). The spindle control circuit 14 has a gain adjusting portion 41 wherein a predetermined gain has been set initially.

A method of learning a change in torque of the spindle motor will be described below. As described above, if the drive torque of the motor and the gain of the control circuit have variations, the time required to reach a certain rotation frequency fluctuates. Since FG is supplied to the DSP 34 and one period of the signal is always measured for frequency control, the current rotation speed can be detected by the period conversely. For example, the time required until the rotation speed rises from 0 rpm (stop condition) to 500 rpm is measured. A gain corresponding to the measured time and to be set on the adjusting portion 41 is stored in the ROM of the DSP 34 as tabulated values and referred to. Alternatively, by obtaining a relational equation and by executing its arithmetic operation with respect to Core of the DSP 34, a gain can be obtained and set in the gain setting RAM in the DSP 34.

By setting the setting values obtained in accordance with the start time of the spindle motor as described above on the gain adjusting portion 41, adverse effects due to torque variations, backlash, friction and the like of the spindle motor can be absorbed, whereby a stable rotation control system can be configured.

The above description of the present embodiment has mentioned that the time required until the rotation speed rises from 0 rpm to 500 rpm is measured. However, in this case, immediately after the power is turned off and on, or reset during the operation of the apparatus, the spindle motor rotates continuously because of its inertia. Therefore, if the system waits until the rotation speed reaches 0 or until the rotation stops, a long time is required for retrial of operation. If the embodiment is configured so as to measure the time for a change between two rotation speeds, from 300 rpm to 500 rpm, for example, the waiting time can be eliminated even when the power is turned off and on. Therefore, the start (rotation change) time values A, B and C of the spindle can be measured accurately. In addition, by setting the rotation speeds at the two points which are learnt in accordance with the playback speed of CD or the like, accurate torque learning is made possible, and stabler rotation control can be attained. Furthermore, in particular, by setting the rotation speeds at the two points so that the higher speed is twice as high as the lower speed, software processing can be made simple, and accurate measurement can be attained.

In addition, in the case that a single apparatus, such as a CD player, has various playback speed modes, such as the 8 cm (single) disk playback mode and 12 cm disk playback mode, as well as the standard speed mode, 2× speed mode and 8× speed mode, a stabler rotation control system can be attained by executing learning for each type (diameter) of disk or for each playback speed.

By using the first to seventh embodiments described above, while information having been recorded on CD-R for example is protected, reproduction or recording can be carried out on a novel high-density disk. Furthermore, regardless of the type of the disk having been loaded at the time of start, the apparatus can be started in a standby mode wherein the disk can be identified immediately and used for reproduction (recording). Even when a disk having large wobbling or eccentricity is used, focus control and tracking control are pulled in immediately after the start of operation and before rotation speed remains low by using the eighth embodiment, whereby high-speed starting and high-speed reproduction can be attained. In a similar way, when control pull-in is ended in failure due to use of a disk having large wobbling or eccentricity, the rotation speed is lowered, pull-in is carried out, and the rotation speed is restored to its predetermined value by using the ninth embodiment, whereby high-speed reproduction can be attained securely. Moreover, by measuring a change and variations in the motor torque by using FG which uses a rotation speed shifting time between two points to perform speed control, accurate motor learning can be attained without any cost increase, and a stable rotation control system can be configured.

Additionally, the distinction of the presence or absence of a disk described in accordance with the above-mentioned fourth embodiment can be made by measuring the rising time of the motor, and by using the measured value. When no disk is present, the motor has low inertia and quickly reaches its predetermined rotation speed or becomes out of control, thereby preventing locking. Therefore, if the rising time of the motor is beyond the predetermined range, it is possible to determine that no disk has been loaded. By making the distinction of the presence or absence of a disk in this way, two steps, that is, the starting of the motor and the distinction of the presence or absence of a disk, can be carried out in parallel, whereby the start time can be shortened.

As clarified by the above descriptions, in the present invention, laser light is cast without pulling in focus control and tracking control, and distinction is made to determine whether a loaded disk is a high-density disk or a super high-density disk or not. The converged beam of the light thus strikes the recording surface of the disk for a very short time (several-milliseconds or less). Therefore, even if one of information marks is lost by the striking of the beam, the lost mark is correctable sufficiently, whereby no problem is caused in the reproduction of information.

Besides, in the present invention, the distinction of the type of disk is made while the emission of the laser light is carried out in the order from a laser with a longer wavelength to a laser with a shorter wavelength. Therefore, the laser light with a shorter wavelength is not cast to recordable media (CD-R and the like). As a result, CD, which has been unable to be played back by using a single laser with a shorter wavelength, can be played back, and information on a recordable disk, such as CD-R, is prevented from being erased by the laser light with a shorter wavelength.

Furthermore, in the present invention, an apparatus with high reproduction power (reproduction-compatible apparatus for disks, such as CD-RW) is configured to carry out emission at low power during the above-mentioned distinction. Therefore, even if the laser light with a shorter wavelength should be cast to such as CD-R or the like because of an error in the distinction, information can be prevented completely from being erased.

Additionally, in the present invention, even a disk with large wobbling or eccentricity can be played back at high speed.

Moreover, in the present invention, by measuring a change and variations in the motor torque by using FG which uses a rotation speed shifting time between two points to perform speed control, accurate motor learning is made possible without any cost increase, and stable rotation control system can be attained.

Consequently, as a whole, the present invention can reliably attain high-speed reproduction on the conventional disks, such as CD and CD-R, and can reliably perform reproduction and recording on novel high-density disks in a similar way.

What is claimed is:

1. An optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, an amplitude detection means for measuring the amplitude of said signal of said convergence condition detection means, and a focus control means for driving said movement means in accordance with said output signal of said convergence condition detection means and for performing control so that the convergence condition of said light beam on said information carrier becomes substantially constant, wherein at the start or restart of said apparatus, before said focus control means is driven, when one of said light sources with a predetermined wavelength is turned on, and when said movement means is driven to move said converging means close to and then away from said information carrier or away from and then close to said information carrier, said apparatus makes distinction to determine the type of said loaded information carrier on the basis of a signal from said amplitude detection means; if said light source with said predetermined wavelength is not compatible with the type of said loaded information carrier having been subjected to the distinction, another light source with a different wavelength is turned on, and said apparatus eventually finds a light source compatible with the type of said loaded information carrier and then drives said focus control means.

2. An optical disk apparatus in accordance with claim 1, wherein
the switching of said plural light sources with different wavelengths is carried out in the order from a light source with a longer wavelength to a light source with a shorter wavelength.

3. An optical disk apparatus in accordance with claim 1, wherein
one of said light sources with a predetermined wavelength is turned on at low power at first, and the power is raised to a predetermined level after it is confirmed that said information carrier is present.

4. An optical disk apparatus in accordance with claim 1, wherein
the type of said information carrier compatible with said light source with the longest wavelength is CD, CD-R or CD-RW.

5. An optical disk apparatus in accordance with claim 1, wherein
said light sources are a light source with a long wavelength and a light source with a wavelength shorter than said long wavelength.

6. An optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, and a focus control means for driving said movement means in accordance with said output signal of said convergence condition detection means and for performing control so that the convergence condition of said light beam on said information carrier becomes substantially constant, wherein
at the start or restart of said apparatus, before said focus control means is driven, when one of said light sources with a predetermined wavelength is turned on, and when said movement means is driven to move said converging means close to and then away from said information carrier or away from and then close to said information carrier, said apparatus makes distinction to determine the type of said loaded information carrier on the basis of the result of a predetermined arithmetic operation of a signal obtained from a predetermined means; if said light source with said predetermined wavelength is not compatible with the type of said loaded information carrier having been subjected to the distinction, another light source with a different wavelength is turned on, and said apparatus eventually finds a light source compatible with the type of said loaded information carrier and then drives said focus control means, and
said signal obtained from said predetermined means is a signal obtained by combining a plurality of signals including: (1) a signal from said convergence condition detection means, (2) a total light amount signal corresponding to the amount of light reflected from said information carrier and (3) an information signal recorded on said information carrier or a signal obtained by the envelope detection of said information signal.

7. An optical disk apparatus in accordance with claim 6, wherein
the switching of said plural light sources with different wavelengths is carried out in the order from a light source with a longer wavelength to a light source with a shorter wavelength.

8. An optical disk apparatus in accordance with claim 6, wherein
one of said light sources with a predetermined wavelength is turned on at low power at first, and the power is raised to a predetermined level after it is confirmed that said information carrier is present.

9. An optical disk apparatus in accordance with claims 6, wherein
the type of said information carrier compatible with said light source with the longest wavelength is CD, CD-R or CD-RW.

10. An optical disk apparatus in accordance with claim 6, wherein
said light sources are a light source with a long wavelength and a light source with a wavelength shorter than said long wavelength.

11. An optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, a reproduction signal detection means for detecting the amplitude of an information signal recorded on said information carrier or the amplitude of a signal obtained by the envelope detection of said information signal, and a focus control means for driving said movement means in accordance with said output signal of said convergence condition detection means and for performing control so that the convergence condition of said light beam on said information carrier becomes substantially constant, wherein
at the start or restart of said apparatus, before said focus control means is driven, when one of said light sources with a predetermined wavelength is turned on, and when said movement means is driven to move said converging means close to and then away from said information carrier or away from and then close to said information carrier, said apparatus makes distinction to determine the type of said loaded information carrier on the basis of a signal from said reproduction signal detection means; if said light source with said predetermined wavelength is not compatible with the type of said loaded information carrier having been subjected to the distinction, another light source with a different wavelength is turned on, and said apparatus eventually finds a light source compatible with the type of said loaded information carrier and then drives said focus control means.

12. An optical disk apparatus in accordance with claim 11, wherein
the switching of said plural light sources with different wavelengths is carried out in the order from a light source with a longer wavelength to a light source with a shorter wavelength.

13. An optical disk apparatus in accordance with claim 11, wherein
one of said light sources with a predetermined wavelength is turned on at low power at first, and the power is raised to a predetermined level after it is confirmed that said information carrier is present.

14. An optical disk apparatus in accordance with claim 11, wherein
the type of said information carrier compatible with said light source with the longest wavelength is CD, CD-R or CD-RW.

15. An optical disk apparatus in accordance with claim 11, wherein
said light sources are a light source with a long wavelength and a light source with a wavelength shorter than said long wavelength.

16. An optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, and a focus control means for driving said movement means in accordance with said output signal of said convergence condition detection means and for performing control so that the convergence condition of said light beam on said information carrier becomes substantially constant, wherein
at the start or restart of said apparatus, before said focus control means is driven, when one of said light sources with a predetermined wavelength is turned on, and when said movement means is driven to move said converging means close to and then away from said information carrier or away from and then close to said information carrier, said apparatus makes distinction to determine the type of said loaded information carrier on the basis of the result of a predetermined arithmetic operation of a signal obtained from a predetermined means; if said light source with said predetermined wavelength is not compatible with the type of said loaded information carrier having been subjected to the distinction, another light source with a different wavelength is turned on, and said apparatus eventually finds a light source compatible with the type of said loaded information carrier and then drives said focus control means, and
said signal obtained from said predetermined means is a signal obtained by combining a plurality of signals including: (1) a signal from said convergence condition detection means, (2) a total light amount signal corresponding to the amount of light reflected from said information carrier and (3) an information signal recorded on said information carrier or a signal obtained by the envelope detection of said information signal.

17. An optical disk apparatus for reproducing information from plural types of information carriers or for recording information to plural types of information carriers, comprising a rotation means for rotating said information carrier, two or more light sources with different wavelengths, a converging means for converging a light beam emitted from each of said light sources on said information carrier, a movement means for moving the converged spot of said light beam converged by said converging means in a direction substantially perpendicular to the surface of said information carrier, and a convergence condition detection means for outputting a signal corresponding to the convergence condition of said light beam on said information carrier, wherein
at the start or restart of said apparatus and with said rotation means remained nonoperable, when each of said light sources is turned on and light with a wavelength corresponding to said light source is cast, and when said movement means is driven to move said converging means close to and then away from said information carrier or away from and then close to said information carrier, said apparatus makes distinction between the presence or absence of said information carrier on the basis of a signal obtained from a predetermined means,
wherein said signal obtained from said predetermined means is: (1) a signal from said convergence condition detection means, (2) a total light amount signal corresponding to the amount of light reflected from said information carrier, (3) an information signal recorded on said information carrier or a signal obtained by the envelope detection of said information signal, or a signal obtained by combining a plurality of signals of these signals.

18. An optical disk apparatus for reproducing information from plural types of information carriers or for recording information to plural types of information carriers, comprising
at least two light sources each with different wavelengths,
converging means for converting a light beam emitted from each of said light sources on said information carrier,
movement means for moving the converged spot of said light beam converged by said converging means in a direction substantially perpendicular to the surface of said information carrier,
convergence condition detection means for outputting a signal corresponding to the convergence condition of said light beam on said information carrier,
distinction signal detection means for detecting the signal obtained from the reflected light or the transmitted light from said information carrier when said movement means is driven to move said converging means close to and then away from said information carrier or away from and then close to said information carrier at the start or restart of said optical disk apparatus, and
focus control means for driving said movement means in accordance with the output signal of said convergence condition detection means and for performing control so that the convergence condition of said light beam on said information carrier becomes approximately constant, wherein
one of said light sources with a long wavelength is turned on; said convergence condition detection means and said movement means are driven, and distinction is made as to whether said loaded information carrier is a first information carrier or not, on the basis of the signal of said distinction signal detection means; and if distinction is made that said loaded information carrier is not said first information carrier, another light source with a short wavelength for a second information carrier is turned on.

19. An optical disk apparatus in accordance with claim 18, wherein said distinction signal detection means comprises an amplitude detection means for measuring the amplitude of said signal of said convergence condition detection means when said movement means is driven to move said converging means close to and then away from said information carrier or away from and then close to said information carrier at the start or restart of said optical disk apparatus.

20. An optical disk apparatus in accordance with claim 18, wherein said distinction signal detection means comprises a total light amount signal detection means for outputting a signal corresponding to the amount of light reflected from said information carrier when said converging means is moved close to and then away from said information carrier or away from and then close to said information carrier at the start or restart of said optical disk apparatus.

21. An optical disk apparatus in accordance with claim 18, wherein said distinction signal detection means comprises a reproduction signal detection means for detecting the amplitude of an information signal recorded on said information carrier or the amplitude of a signal obtained by the envelope detection of said information signal when said movement means is driven to move said converging means close to and then away from said information carrier or away from and then close to said information carrier at the start or restart of said optical disk apparatus.

* * * * *

UNITED STATES PATENT AND TRADEMARK OFFICE
CERTIFICATE OF CORRECTION

PATENT NO. : 6,285,635 B1
DATED : September 4, 2001
INVENTOR(S) : Watanabe et al.

It is certified that error appears in the above-identified patent and that said Letters Patent is hereby corrected as shown below:

<u>Title page,</u>
Item [54], insert before "OPTICAL DISK APPARATUS" -- AN --.
Item [73], Assignee, "Matsushia" should read -- Matsushita --.

<u>Column 29,</u>
Line 27 through column 30, line 3, delete "claim 6"
Line 27, insert:

-- 6. An optical disk apparatus for reproducing information from plural types of information carriers or for recording information to plural types of information carriers, comprising two or more light sources with different wavelengths, a converging means for converging a light beam emitted from each of said light sources on said information carrier, a movement means for moving the converged spot of said light beam converged by said converging means in a direction substantially perpendicular to the surface of said information carrier, a convergence condition detection means for outputting a signal corresponding to the convergence condition of said light beam on said information carrier, a total light amount detection means for outputting a signal corresponding to the amount of light reflected from said information carrier, and a focus control means for driving said movement means in accordance with said output signal of said convergence condition detection means and for performing control so that the convergence condition of said light beam on said information carrier becomes substantially constant, wherein at the start or restart of said apparatus, before said focus control means is driven, when one of said light sources with a predetermined wavelength is turned on, and when said movement means is driven to move said converging means close to and then away from said information carrier or away from and then close to said

UNITED STATES PATENT AND TRADEMARK OFFICE
CERTIFICATE OF CORRECTION

PATENT NO. : 6,285,635 B1
DATED : September 4, 2001
INVENTOR(S) : Watanabe et al.

It is certified that error appears in the above-identified patent and that said Letters Patent is hereby corrected as shown below:

Column 29, line 27, cont'd.
information carrier, said apparatus makes distinction to determine the type of said loaded information carrier on the basis of a signal from said total light amount detection means; if said light source with said predetermined wavelength is not compatible with the type of said loaded information carrier having been subjected to the distinction, another light source with a different wavelength is turned on, and said apparatus eventually finds a light source compatible with the type of said loaded information carrier and then drives said focus control means. --

Signed and Sealed this

Nineteenth Day of November, 2002

*Attest:*

JAMES E. ROGAN
*Attesting Officer*    *Director of the United States Patent and Trademark Office*